Nov. 14, 1967   L. L. ROSEN   3,352,164
GYRO MONITOR ADAPTIVE MECHANIZATION
Filed Feb. 23, 1965   6 Sheets-Sheet 1

INVENTOR.
LEONARD L. ROSEN
BY
ATTORNEY

Nov. 14, 1967 L. L. ROSEN 3,352,164
GYRO MONITOR ADAPTIVE MECHANIZATION
Filed Feb. 23, 1965 6 Sheets-Sheet 2

INVENTOR.
LEONARD L. ROSEN
BY
ATTORNEY

Nov. 14, 1967     L. L. ROSEN     3,352,164
GYRO MONITOR ADAPTIVE MECHANIZATION
Filed Feb. 23, 1965     6 Sheets-Sheet 3

MONITOR GYRO MISALINEMENTS

INVENTOR.
LEONARD L. ROSEN
BY
ATTORNEY

Nov. 14, 1967

L. L. ROSEN 3,352,164

GYRO MONITOR ADAPTIVE MECHANIZATION

Filed Feb. 23, 1965

INVENTOR.
LEONARD L. ROSEN

BY
ATTORNEY

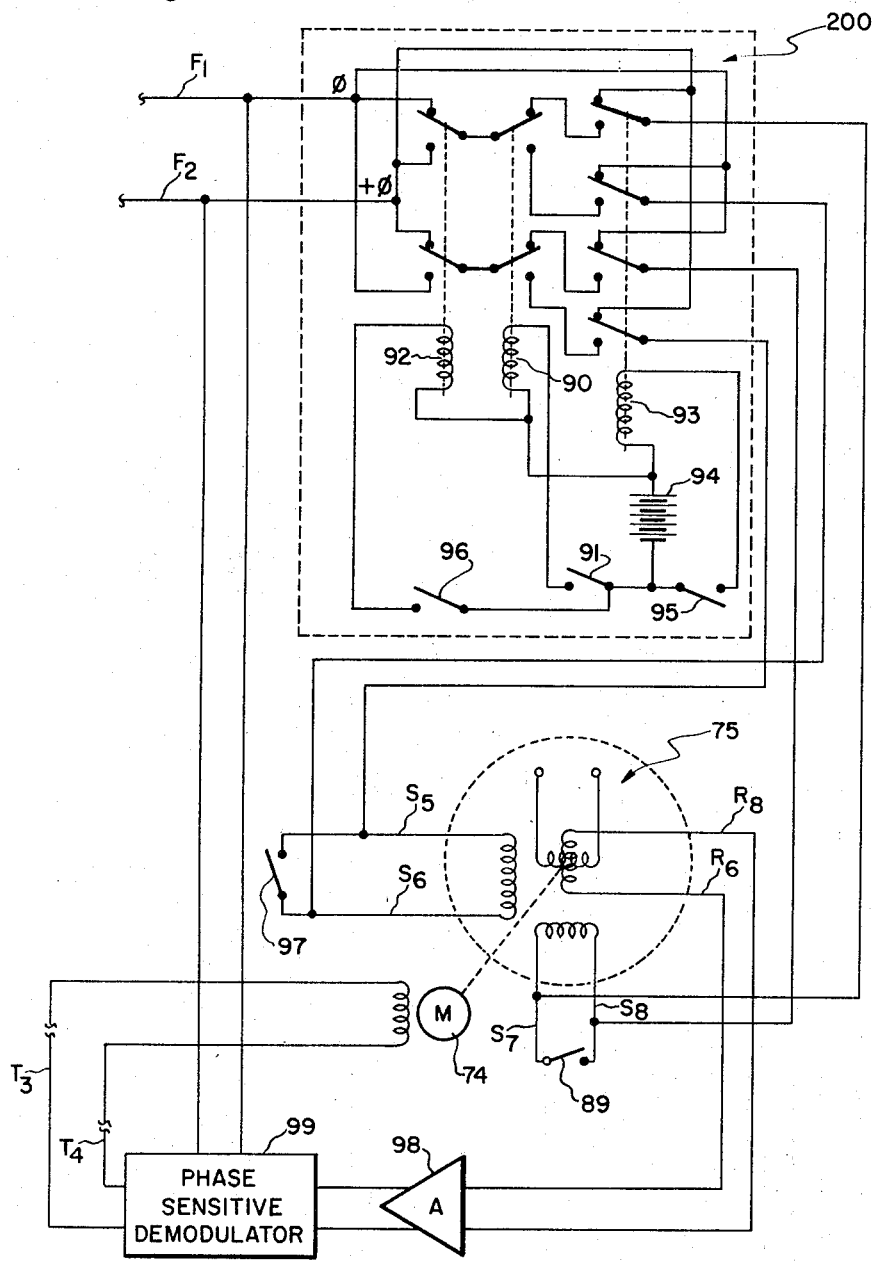

Nov. 14, 1967  L. L. ROSEN  3,352,164
GYRO MONITOR ADAPTIVE MECHANIZATION
Filed Feb. 23, 1965  6 Sheets-Sheet 6

| COORDINATE HEADING | RELAYS ENERGIZED AND SWITCHES CLOSED | $S_1$ | $S_3$ | $S_2$ | $S_4$ | $S_5$ | $S_6$ | $S_7$ | $S_8$ |
|---|---|---|---|---|---|---|---|---|---|
| HOME | | +∅ | | +∅ | | +∅ | +∅ | | |
| +X | 80, 84, 97, 93 | | +∅ | ⌐⌐ | | ⌐⌐ | | | +∅ |
| +Y | 81, 83, 84, 97, 93 | | | ⌐⌐ | +∅ | | ⌐⌐ | | +∅ |
| −X | 80, 82, 84, 97, 93 | +∅ | | ⌐⌐ | | ⌐⌐ | | | +∅ |
| −Y | 81, 82, 83, 84, 97, 93 | | | ⌐⌐ | | +∅ | ⌐⌐ | | +∅ |
| +Z | 80, 84, 93, 90, 89 | | | +∅ | ⌐⌐ | +∅ | | ⌐⌐ | |
| −Z | 80, 82, 84, 93, 89, 90 | +∅ | | ⌐⌐ | | +∅ | | ⌐⌐ | |
| +X | 80, 82, 84, 97, 92, 93 | +∅ | | ⌐⌐ | | | ⌐⌐ | +∅ | |
| +Y | 81, 82, 83, 84, 97, 92, 93 | | ⌐⌐ | | +∅ | | ⌐⌐ | +∅ | |
| −X | 80, 84, 97, 92, 93 | | | ⌐⌐ | +∅ | | ⌐⌐ | +∅ | |
| −Y | 81, 83, 84, 97, 92, 93 | | ⌐⌐ | | +∅ | | ⌐⌐ | +∅ | |
| +Z | 80, 82, 84, 89, 90, 93, 92 | +∅ | | ⌐⌐ | | | | +∅ | ⌐⌐ |
| −Z | 80, 84, 89, 90, 92, 93 | | +∅ | ⌐⌐ | | | | +∅ | ⌐⌐ |

+∅ = POSITIVE PHASE OF REFERENCE GENERATOR

⌐⌐ = INDICATES SHORT

INVENTOR.
LEONARD L. ROSEN
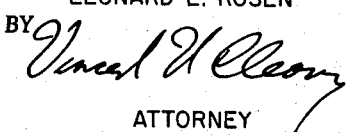
ATTORNEY

United States Patent Office 3,352,164
Patented Nov. 14, 1967

3,352,164
GYRO MONITOR ADAPTIVE MECHANIZATION
Leonard L. Rosen, Anaheim, Calif., assignor to
North American Aviation, Inc.
Filed Feb. 23, 1965, Ser. No. 435,409
15 Claims. (Cl. 74—5.34)

ABSTRACT OF THE DISCLOSURE

A method and means for monitoring the gyroscopes of a three-axis gyroscopically stabilized platform for determining and correcting for the drift rates and errors of the controlling gyro loops. A monitor gyroscope is mounted on the platform with its input axis sequentially aligned parallel to the input axis of each controlling gyroscope. In this manner, the drift of each controlling gyroscope is determined. To eliminate the monitor gyroscope's drift, its input axis is aligned in alternate parallel directions to each controlling gyroscope's input axis.

---

This invention pertains to a method and means for monitoring the gyroscopes of a gyroscopically stabilized platform and more particularly to a method and means for determining and correcting for the uncompensated loop drift rates, errors, of controlling gyro loops. This invention even more specifically is a method and means of mechanizing a complete gyro monitor so that in addition to determining the control loop uncompensated drift rates, the monitor error sources that contaminate this determination may be also determined.

The only present monitor systems are two-axis systems. The accuracies of these systems are either very poor or require quite tight manufacturing tolerances for long-term stabilities. The concept of this invention adds a third axis for monitoring, and then uses the three axes in an adaptive mechanization that removes almost all tight manufacturing tolerances and relieves stability requirements for many components.

In long-term inertial navigation—navigation for periods in excess of several hours—the dominant error sources are the gyro loop uncompensated drift rates. These drift rates are composed of many variables depending upon the system configuration and mechanization. Among these variables are gyro random drifts: gyro drifts resulting from sensitivities to power, temperature, pressure, acceleration, magnetic fields, etc.; gyro scale factor errors; gyro axis misalignments; gyro spring-rate coupled drifts; along with bias and scale factor uncertainties in the torquing electronics. These drifts may be due to initial biasing uncertainties, to instabilities arising after initial biasing, or to vehicle movement or positon. In any event these uncompensated loop drift rates must be removed or minimized to obtain precise navigation.

Classical methods of eliminating these drift rates consist of using periodic external position information as known inputs to analytical expressions relating the functional dependence of position on the drift rates and then regressing, in one of many ways, to provide estimates of the drift rate driving functions. These estimates are then used to correct the gyro loops, usually via a repeating computer mechanization. The disadvantages of these techniques are: accurate drift rate calculations can only be made periodically; the drift rates must remain constant over the entire biasing cycle and/or the statistics of the random drifts must be reasonably well-known; and accurate biasing requires external position information as frequent intervals.

Another scheme that has been used to correct for imperfections in the stabilizing gyroscopes of inertial navigation systems is described in U.S. Patent No. 2,999,391, entitled, "Self-Compensating Gyro Apparatus," by D. L. Freebairn et al., assigned to North American Aviation, Inc., the assignee of this invention. In the device of this patent two gyroscopes are positioned on each of the axes about which the platform is to be stabilized with their input axes parallel. The direction of rotation of each of the gyro rotors, or the angular momentum, is periodically and alternately reversed. By reversing the direction of rotation of the rotor, errors associated with rotor rotation are thereby averaged or cancelled out.

A method of reducing gyro loop uncompensated drift rates that does not suffer from the previously mentioned disadvantages is described in the following specification. The method, called "gyro monitoring," makes use of a redundant gyroscope placed on the stable element, comconly called the "platform," and positioned so as to acquire information about the input axis (sensing axis) of the controlling gyro loops. The drift error present in a stable-element-controlling gyroscope will cause the stable element to drift about the input axis of that gyroscope. By aligning the input axis of the monitor gyroscope parallel to the input axis of one and in turn all of the controlling gyroscopes, the drift about that axis will appear as a torque on the output axis of the monitor gyroscope. The monitor gyroscope also has inherent in its structure its own drift errors and, therefore, the total torque present on its output axis will be proportional to the algebraic sum of the controlling gyroscope's drift errors and the monitor gyroscope's drift errors.

The algebraic sign of the controlling gyroscope's drift error as sensed at the output axis of the monitor gyroscope, will be reversed by rotating the monitor gyroscope's input axis 180 degrees such that its input axis is again parallel but in the reversed sense, to the controlling gyroscope's input axis. A simultaneous solution of the two output torque signals present at the output axis of the monitor gyroscope will thereby yield a solution which is equal to the controlling gyroscope's drift error. Once the error is determined it may be corrected by applying a correction torque counter to the drift (error) torque.

The mechanization described herein is applied to a three-gyroscope stabilized inertial platform. This particular mechanization makes it feasible to determine and correct for the drifts of all three platform controlling gyroscopes. It will be obvious to those persons skilled in the art to extend the mechanization disclosed herein to the stable element mounted accelerometers or velocity meters by adding a monitor accelerometer or velocity meter to the supporting structure of the monitoring gyroscope and monitor each of the controlling accelerometer or velocity meters by the mechanization disclosed herein.

For an example of an inertial platform stabilized by three gyroscopes, see U.S. Patent No. 2,993,267, entitled, "Gyroscopically Stabilized Navigational Reference Device," by J. M. Slater et al., assigned to North American Aviation, Inc.

It is, therefore, an obect of this invention to utilize a monitor gyroscope to determine the drift errors inherent in the controlling gyroscope loops of a gyroscopically stabilized platform.

It is a further object of this invention to provide a monitor gyroscope having a unique gimballed mounting orientation, relative to a stabilized platform, for calibrating the errors inherent in the gyroscope loops which stabilize the platform.

It is a further object of this invention to provide a method for determining and correcting for the drift of the platform controlling gyroscope loops while at the same time obtaining data which will allow the elimination of error sources inherent to the monitor device which, if left, would appreciably degrade the determination of these controlling gyroscope loop drift rates.

It is yet another object of this invention to provide a means for determining and correcting the drift of controlling gyroscope loops which does not require tight manufacturing tolerances or shipping and handling stabilities; substituting in place, only certain, requirements for long term stabilities only under normal installed and operating conditions.

It is still a further object of this invention to provide a means and method for determining and correcting the drift of platform controlling gyroscope loops which is completely automatic.

It is another object of this invention to provide a means and method for determining and correcting the drifts of platform controlling gyroscope loops with a substantial reduction of reliance on external information.

These and other objects of the invention will become more apparent from the following description taken in connection with the accompanying drawings, in which:

FIG. 6 is a schematic diagram, illustrating the electronics required for operation of the monitor gyroscope about the $\phi$ axes;

FIG. 7 is a chart, illustrating the correct relay energizing sequence used in obtaining the different positions of the monitor gyroscope.

Figure 1:
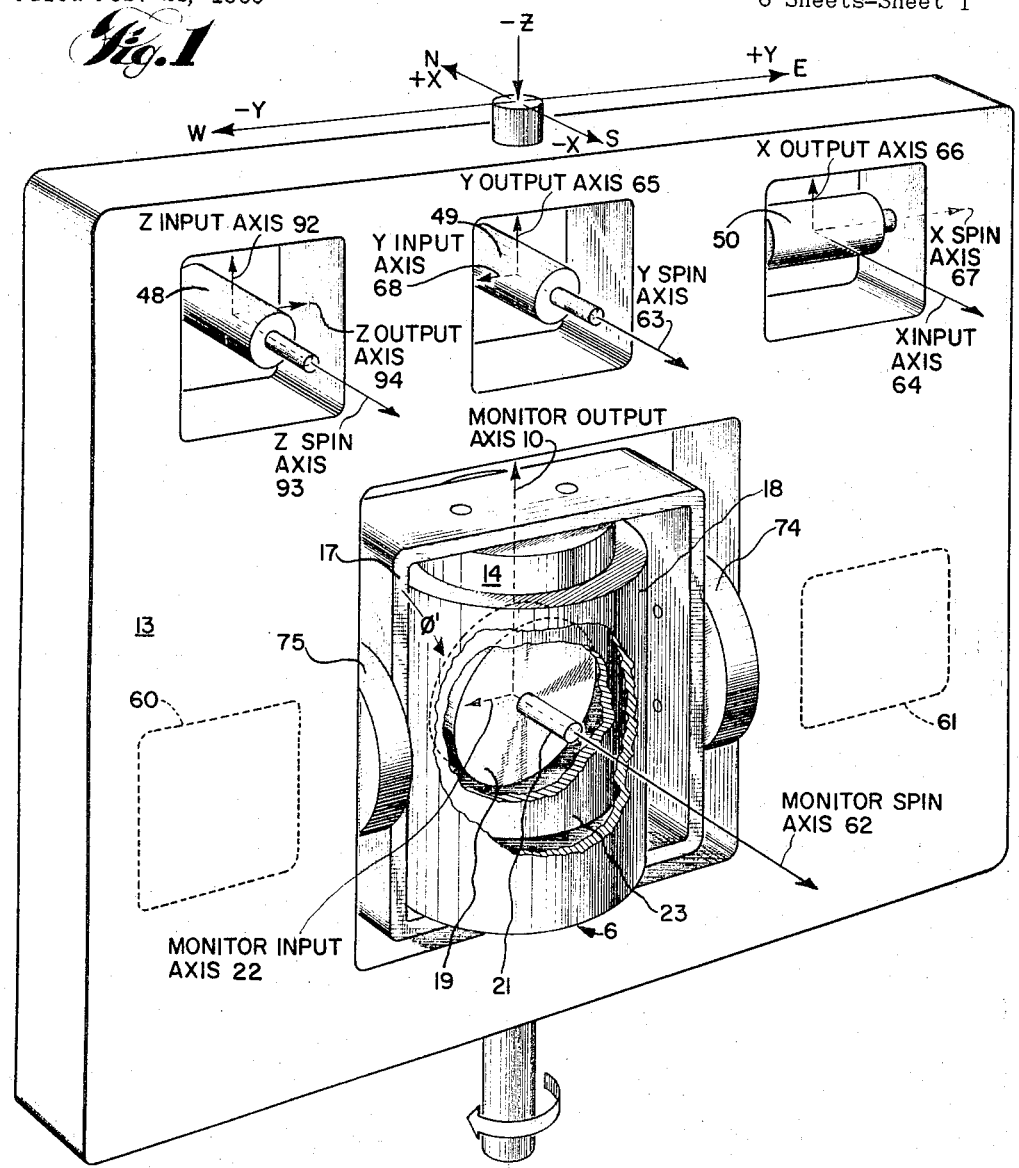
FIG. 1 is a cutaway perspective view, illustrating the mounting of the monitor gyroscope to the stabilized platform.

Referring to FIG. 1, three single-degree-of-freedom gyroscopes 48, 49 and 50 are mounted to the stabilized platform 13 with their nominal input axes 92, 68 and 64 mutually orthogonal. Gyroscopes 48, 49 and 50 stabilize platform 13 about a coordinate system defined by the input axes of the stabilizing gyroscopes.

The gyroscope spin axes 93, 63 and 67 and output axes 94, 65 and 66, along with input axes 92, 68 and 64, form a set of mutually orthogonal vectors for gyroscopes 48, 49 and 50, respectively.

Gyroscopes suitable for use on platform 13 are described in U.S. Patent No. 2,995,937, entitled, "Floatation Gyroscope," by J. M. Slater et al., and assigned to North American Aviation, Inc. Stabilized platform 13 also carries a pair of velocity meters 60 and 61, the position outlines of which are illustrated only. A typical velocity meter which may be positioned upon the stabilized platform to measure velocity is described in U.S. Patent No. 3,077,782, entitled "Inertial Velocity Meter," by J. M. Slater, et al., assigned to North American Aviation, Inc.

Platform 13 is maintained with the platform X–Y plane in the horizontal position and in some predetermined azimuth orientation, for example, north, south, east, west, by velocity meters 60 and 61, gyroscopes 48, 49 and 50, and other controls not in themselves a part of this invention.

Figure 2:
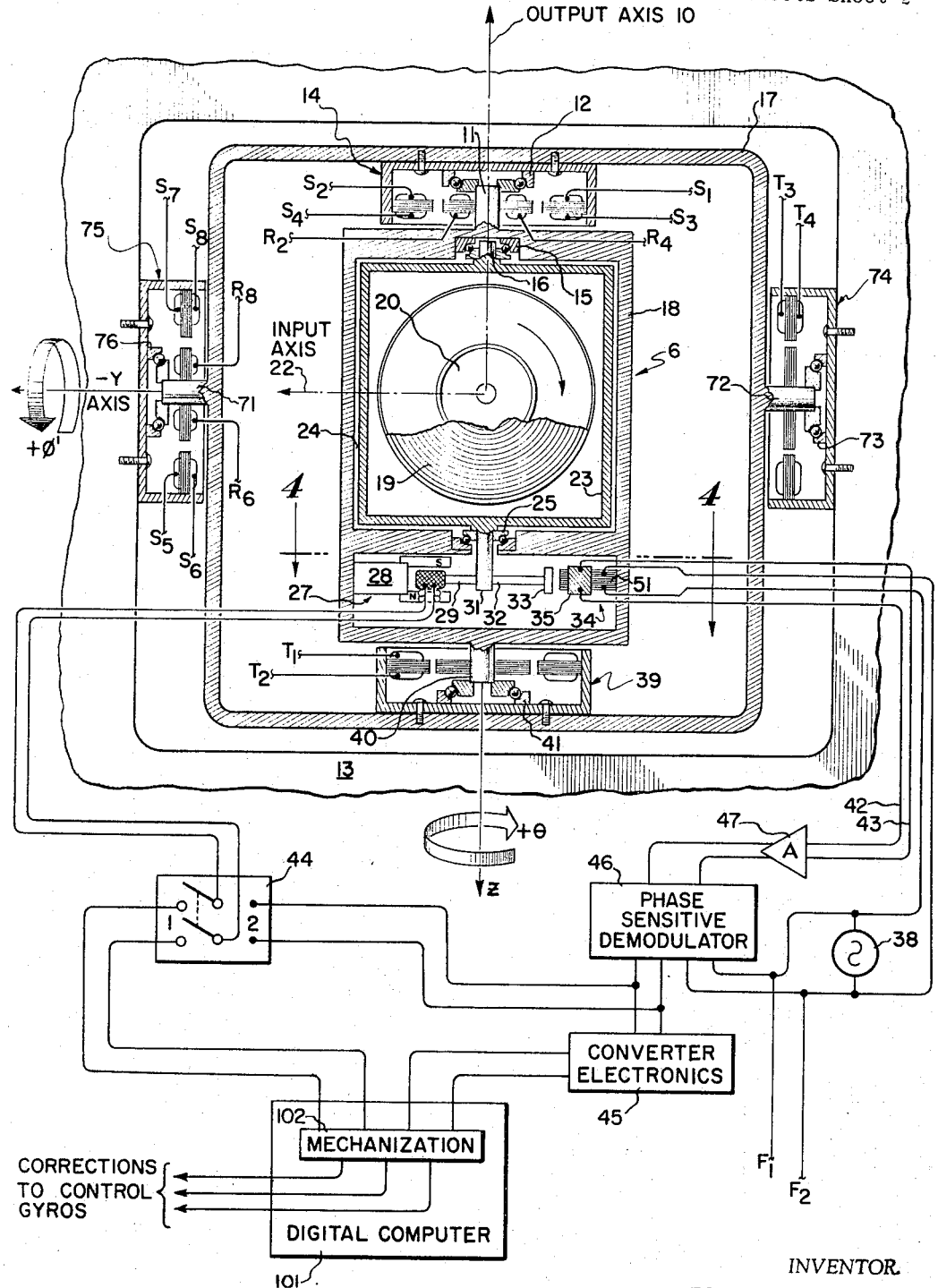
FIG. 2 is a sectional view, illustrating the monitor gyroscope, its physical placement and a portion of the electronics required to control the monitor gyroscope.

Monitor gimbal member 17 is rotatably mounted to platform 13 by shafts 71 and 72 and bearings 76 and 73 (illustrated in FIG. 2). Shafts 71 and 72 are aligned approximately along the Y-axis, and define the rotational axis $\phi$ of gimbal 17. Torquer 74 applies the driving torque for rotating gimbal 17. Angle resolver 75 determines the angular displacement of gimbal 17 about the $\phi$-axis. The additional single-degree-of-freedom gyroscope 6, hereinafter referred to as the monitor gyroscope, is rotatably mounted to gimbal 17 by shafts 11 and 40 and bearings 12 and 41 (illustrated in FIG. 2). Shafts 11 and 40 define the rotational axis $\theta$ of gyroscope case 18. Torquer 39 (illustrated in FIG. 2) applies the driving torque for rotating the gyroscope case 18 with respect to gimbal 17. Angle resolver 14 determines the angular displacement of gyroscope case 18 with respect to gimbal 17.

Gyroscope 6 is of the single-degree-of-freedom type having input 22, output 10, and spin 62 axes mutually orthogonal to each other. The gyroscope rotor 19, of a substantial moment of inertia, is supported by shaft 21 and ball bearings (not illustrated) for spinning at high rates of speed. The rotor 19 is housed in an inner case 23 which is rotatably mounted to gyro case 18 by means of shafts 16 and 31 and bearings 15 and 25 (illustrated in FIG. 2).

Referring to FIG. 2, motor 20 supplies the torque necessary for spinning rotor 19. The inner case member 23 is immersed in a fluid 24. The fluid provides a viscous damping to case 23. In the standard nomenclature for gyroscope of the type shown, the normal undeflected direction of the rotor spin axis is termed the spin reference axis and is shown as axis 62 in FIG. 1.

An angle pickoff 34 is provided to give a signal indication of any rotation (precession) of inner case gimbal 23 relative to the gyroscope case 18. The pickoff signal is transmitted to amplifier 47 via leads 42 and 43 and then to the phase sensitive demodulator 46, which provides a D-C signal, the amplitude of which indicates the amount of angular rotation of inner gimbal 23 and the polarity of which indicates the direction of rotation. When switch 44 is in position 2, the signal from the demodulator 46 is sent directly to gyro torquer 27. When switch 44 is in position 1, computer 101 and converter electronics 45 are connected to series between the phase sensitive demodulator 46 and the gyro torquer 27. The angle pickoff 34 then provides the input to the digital computer 101 via the converter 45. The computer is so mechanized by mechanization 102 that the output of the computer signals the torquer 27 to maintain the pickoff 34 at null. The loop is closed when torques proportional to the torquing electronic inputs are applied to the gyro torquer coil. By causing the gyro to precess, these torques drive the pickoff to null. By determining the torque with the monitor gyro input axis 22 aligned first along the plus direction of the control loop sensing axis to be monitored, then along the negative direction, the uncompensated drift rate of that control axis may be determined.

Figure 4:
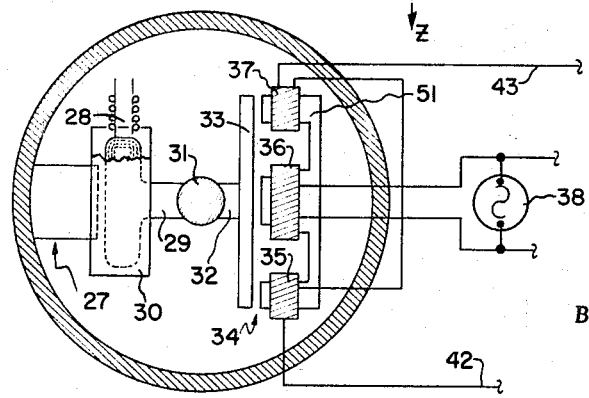
FIG. 4 is a cutaway sectional view of the monitor gyroscope, illustrating the gyroscope's pickoff and torquing means.
Figure 5:
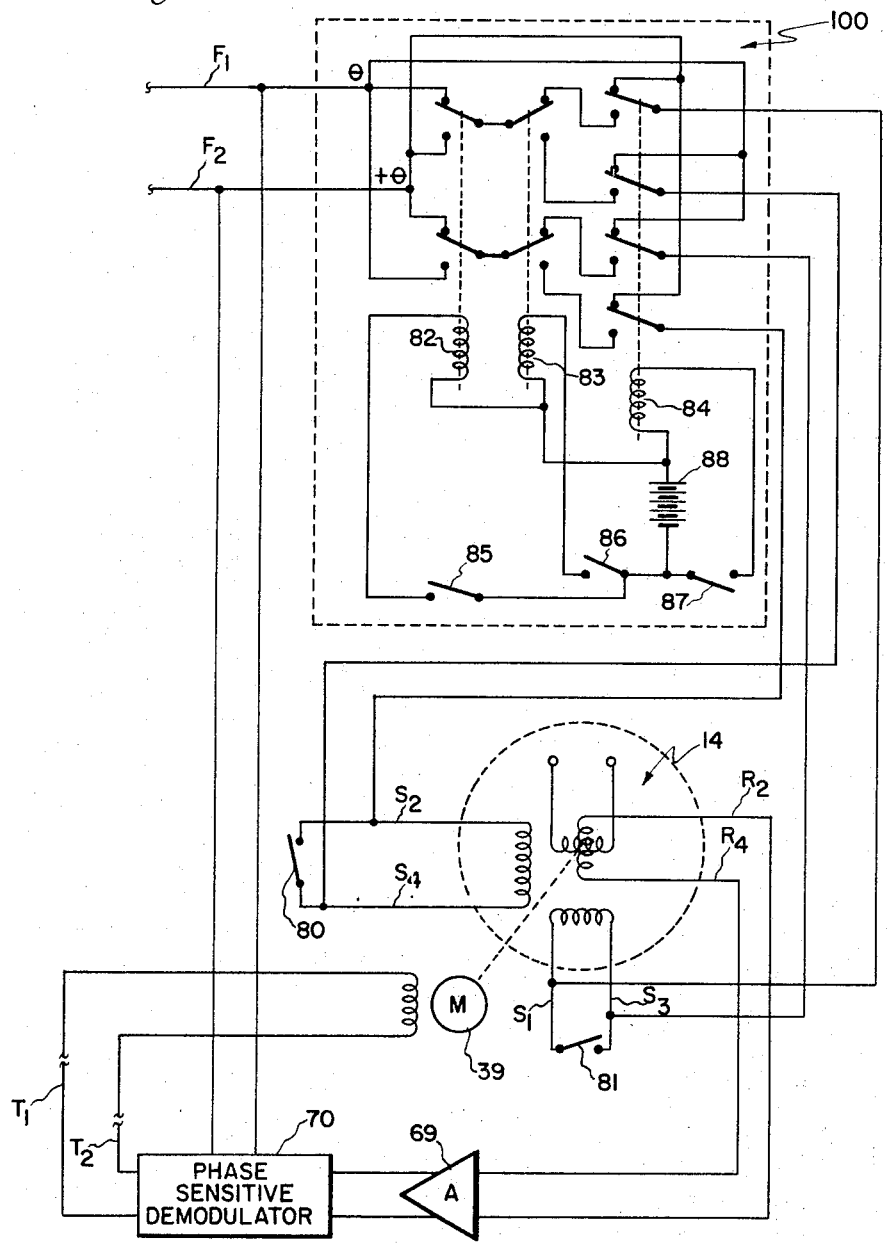
FIG. 5 is a schematic diagram, illustrating the electronics required for operation of the monitoring gyroscope about the $\theta$ axes.

Referring to FIG. 4, the angle pickoff 34 is illustrated as having a soft iron member 33 connected by arm 32 to shaft 31 to be rotated by inner gimbal case 23. Laminated core 51 is an E-type configuration having coils 35 and 37 on its outer limbs to provide an output to amplifier 47. Frequency source 38 is connected to coil 36 on the center limb of core 51 and acts to provide signal excitation. The torquer 27 has an arm and coil 29 attached to shaft 31. The coil extends into the gap of permanent magnet 30 supported by arm member 28. When current flows through coil member 29, a torque is created between the coil and magnet 30 which tends to rotate shaft 31. Frequency source 38 also provides the reference frequency to phase sensitive demodulators 46, 70 and 99 illustrated in FIGS. 5 and 6, respectively. This reference frequency is used to demodulate the output signals from amplifiers 47, 69 and 98.

In order to determine a controlling gyroscope loop drift error accurately, it is necessary to control the input axis 22 accurately with respect to the input axis of the controlling gyroscope under check. This is accomplished, referring to FIGS. 5 and 6, by introducing a signal from signal generator 38 via leads $F_1$ and $F_2$ in various phase relationships, to resolvers 14 and 75. The appropriate selection of resolver winding excitation for the various desired directions of the monitor gyroscope's input axis 22 is given in the chart of FIG. 7. The resolvers 14 and 75 are each capable of positioning the gryoscope case 18 in at leats four different positions. The $\theta$ axis alignment servo, consisting of resolver 14, servo-amplifier 69, phase sensitive demodulator 70, and gimbal torquer motor 39, operates at five distinct positions, four of which are the plus and minus senses of two orthogonal vectors. The fifth position is the home position. This position is necessary to initiate drift-error detection, so that gimbal 17 (for the $\theta$ axis alignment servo) and gyroscope 6 are not driven to their physical limits. A physical limitation is present on the gimbal's motion because of the electrical wire connections that are necessary for the operation of gyroscope 6. The relay bank 100 is provided with power by voltage source 88. The relays 82, 83 and 84 are energized with this voltage source by means of switches 85, 86 and 87, respectively. The relay bank 100 receives via leads $F_1$, $F_2$, the signal from frequency generator 38. Switches 80 and 81 are used to short the resolver stator winding $S_2$ to $S_4$ and $S_1$ to $S_3$, respectively.

The $\phi$ axis or gimbal 17 alignment servo consists of resolver 75, servo-amplifier 98, phase sensitive demodulator 99, and gimbal torquer motor 74. This alignment servo also operates at five different positions. The relay bank 200 is identical to the relay bank 100 in that voltage source 94 is used to energize relays 90, 92 and 93 by means of switches 91, 96 and 95, respectively. The signal from signal generator 38 is applied to relay bank 200 via leads $F_1$ and $F_2$. Switches 89 and 97 are used to short the stator leads from resolver 75; $S_7$ to $S_8$ and $S_5$ to $S_6$, respectively.

Figure 3A:
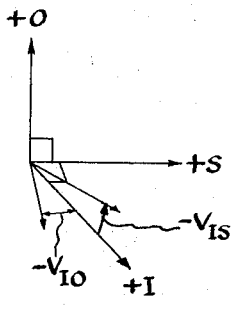
FIG. 3a is a vector diagram illustrating the components of misalignment of the monitor gyroscope's case about its output and spin axes.
Figure 3B:
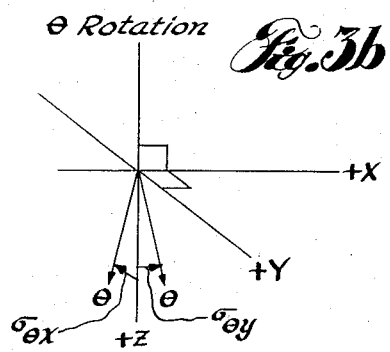
FIG. 3b is a vector diagram illustrating the components of misalignment of the monitor gimbal about the $\theta$ rotation axis.
Figure 3C:
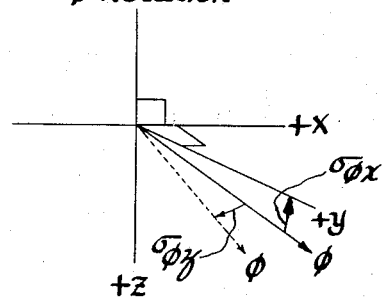
FIG. 3c is a vector diagram illustrating the components of misalignment of the monitor about the $\phi$ rotation axis.

Referring to FIG. 3a, the misalignment of the monitor gyro about its output and spin axes is designated by the vectors $V_{IO}$ and $V_{IS}$. The Cartesian coordinate set used to reference these vectors is designated I, S, and O, corresponding to the input, spin, and output axes of the monitor gyroscope. In FIG. 3b, misalignment of the monitor gimbal axis 11–40 (as shown in FIG. 2) about the platform X, Y axes are designated by the vectors $\sigma_{\theta x}$ and $\sigma_{\theta y}$, respectively. In FIG. 3c, the misalignment of the monitor gimbal axis 71–72 (as shown in FIG. 2) about the platform X, Z axes are given by the vectors $\sigma_{\phi x}$ and $\sigma_{\phi z}$, respectively.

Figure 8:
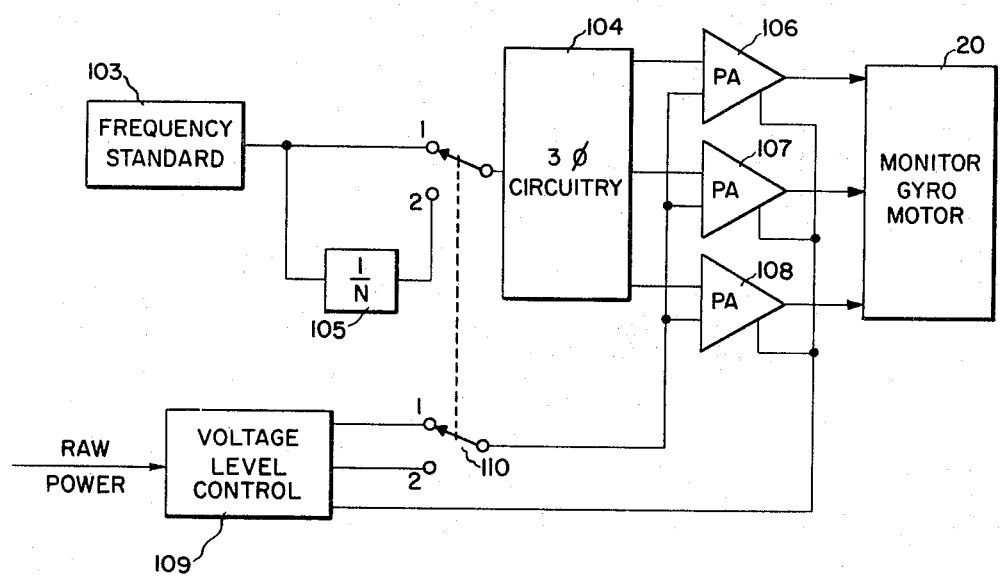
FIG. 8 is a schematic diagram, illustrating the power supply used to vary the speed of the monitor gyroscope's rotor.

Refering to FIG. 8, a simplified circuit that may be utilized to modulate the speed of the monitor gyro rotor is illustrated. The frequency standard 103 generates a frequency for driving the rotor at a high predetermined rate of speed. In the present state of the art the major portion of gyroscope motors are of the 3-phase type. The 3-phase circuitry 104 converts the output from the frequency standard 103 into usable 3-phase excitation signals which are fed to power amplifiers 106, 107 and 108. The outputs of amplifiers 106, 107 and 108 are connected to the monitor gyro motor 20, which in turn drives the gyro rotor. Voltage level control 109 supplies raw power to each of the power amplifiers which in turn control the magnitude of voltage applied to the gyro motor 20. The ganged switch 110 is used to connect the 3-phase circuitry of the power amplifiers to a second frequency level and a second voltage level. The frequency divider 105 acts to divide the frequency output of frequency standard 103 by a predetermined constant dependent upon the value N, and voltage level control 109 acts to control the power amplifier outputs so as to maintain nearly the same power dissipation in either position of switch 110.

*Operation of the monitor gyroscope*

Denoting $E_m$ as the monitor loop uncompensated drift rate and $E_c$ as the control loop uncompensated drift rate, the torque, T, required to maintain the monitor pickoff at null, may be expressed for the two conditions of +monitor and +control axes aligned, and −monitor and +control axes aligned by $$T_+ = E_c - E_m \qquad (1)$$
$$T_- = E_c - E_m \qquad (2)$$

As shown in Equations 1 and 2, the nulling torque caused by the monitor loop drift rate is independent of relative monitor-control axis position, whereas the nulling torque caused by the control loop drift rate reverses with monitor position. Therefore, it is possible to obtain a solution for $E_c$; the control loop uncompensated drift rate: i.e., $$E_c = \frac{1}{2}[T_+ - T_-]$$

Once $E_c$ is determined, a correction to the control loop is made by the computer mechanization 102. Thus, the control loop uncompensated drift rates may be removed as often as the two torque values can be obtained. This procedure may be followed in turn for each control loop.

In order to implement the mechanization, the monitor gyro must be rotatably mounted so as to allow the monitor gyro input axis to be placed at six discrete positions; the plus and minus directions of each of the three control loop sensing axes −X, +X, −Y, +Y, −Z and +Z. A device which allows such positioning freedom in two equivalent but nonsimilar ways is shown in FIGS. 1 and 2 with control shown in FIG. 7.

As can be seen from FIG. 1, rotations about the $\theta$ axis enable monitor gyro input axis 22 positioning in the horizontal plane and rotations about the $\phi$ axis enable monitor gyro input axis positioning in the vertical plane. Each monitor axis utilizes resolver outputs as inputs to positioning servo electronics which, in turn, sends signals to the proper monitor gimbal torque motor to rotate the monitor gyro until the desired position, as determined by the resolver null, is obtained.

The prior discussion assumes that $E_c$ and $E_m$ remain constant under monitor gyro input axis position changes. Except for random drift rate changes with correlation times of the same order as the biasing cycle, this assumption is quite good for $E_c$. For $E_m$, however, the assumption is most unrealistic. In addition to the random drift rates of the monitor loop, there are several dominant deterministic driving functions which cause the monitor gyro loop drift to vary as a function of monitor gyro position. These monitor loop variations affect the caging torque in such a way as to contaminate the determination of control loop drift rates. The error sources which must be considered are: (1) the gyro uncompensated drift rates $Ex$, $Ey$, $Ez$; (2) the loop scale factors, $Kx''$, $Ky''$, $Kz''$, $Km''$; (3) the monitor gyro misalignments $V_{IO}$ and $V_{IS}$; (4) the control gyro misalignments M$xy$, M$yz$, M$yx$, M$zy$; (5) the misalignments of the monitor gimbal rotation axes $\sigma_{\theta x}$, $\sigma_{\theta y}$, $\sigma_{\phi x}$, $\sigma_{\phi z}$; (6) the null offsets of the resolvers used to position the monitor gyro about $\theta$ and $\phi$, $B_{R1}$, $B_{R2}$; (7) the monitor gyro up-down drift sensitivity (mass unbalance) $Em\pm$; and (8) the accelerometer loop biases $\nabla x$ and $\nabla y$.

The torque equations containing each of these error sources may be written at each platform orientation; defining the platform normal orientation as $\alpha = 0$ and +X axis north, +Y axis east and +Z axis vertical down; with $\alpha$ being defined as the angle between the +X axis and north measured about the +Z axis. Thus, the caging torque, $T\alpha(\theta, \phi)$, at platform angle $\alpha$ and monitor position $\theta$ and $\phi$ may be written for all possible positions. Note that $\Omega_N = \Omega \cos \text{LAT.}$ and $\Omega_z = \Omega \sin \text{LAT.}$ At $\alpha=0$ $$T_0(0,0)=E_x-E_m+(K_x''-K_m'')\Omega_N \\ +(-M_{xy}-V_{IS}+B_{R2}+\sigma_{\theta y})\Omega_z \quad (3)$$

$$T_0(180,0)=-E_x-E_m-(K_x''-K_m'')\Omega_N \\ +(M_{xy}-V_{IS}-B_{R2}-\sigma_{\theta y})\Omega_z \quad (4)$$

$$T_0(0,180)=-E_x-E_m-(K_x''-K_m'')\Omega_N \\ +(M_{xy}+V_{IS}-B_{R2}-\sigma_{\theta y})\Omega_z \quad (5)$$

$$T_0(180,180)=E_x-E_m+(K_x''-K_m'')\Omega_N \\ +(M_{xy}-V_{IS}+B_{R2}+\sigma_{\theta y})\Omega_z \quad (6)$$

$$T_0(90,0)=E_y-E_m+(M_{yz}-\sigma_{\phi z}+V_{IO}-B_{R1})\Omega_N \\ +(M_{yx}-V_{IS}-\sigma_{\theta x}-\sigma_{\phi x})\Omega_z \quad (7)$$

$$T_0(-90,0)=-E_y-E_m+(-M_{yz}+\sigma_{\phi x}-V_{IO}+B_{R1})\Omega_N \\ +(-M_{yx}-V_{IS}-\sigma_{\theta x}-\sigma_{\phi x})\Omega_z \quad (8)$$

$$T_0(90,180)=E_y-E_m+(M_{yz}-\sigma_{\phi x}-V_{IO}+B_{R1})\Omega_N \\ +(M_{yx}+V_{IS}+\sigma_{\theta x}-\sigma_{\phi x})\Omega_z \quad (9)$$

$$T_0(-90,180)=-E_y-E_m+(-M_{yz}+\sigma_{\phi z}+V_{IO}-B_{R1})\Omega_N \\ +(-M_{yz}+V_{IS}-\sigma_{\theta x}+\sigma_{\phi x})\Omega_z \quad (10)$$

$$T_0(0,90)=-E_z-E_m+E_{m\pm}+(K_z''-K_m'')\Omega_z \\ +(M_{zy}-B_{R2}-\sigma_{\theta y}+V_{IS})\Omega_N \quad (11)$$

$$T_0(0,-90)=E_z-E_m-E_{m\pm}-(K_z''-K_m'')\Omega_z \\ +(-M_{zy}+B_{R2}+\sigma_{\theta y}-V_{IS})\Omega_N \quad (12)$$

$$T_0(180,90)=E_z-E_m-E_{m\pm}-(K_z''-K_m'')\Omega_z \\ +(-M_{zy}-B_{R2}-\sigma_{\theta y}-V_{IS})\Omega_N \quad (13)$$

$$T_0(180,-90)=-E_z-E_m+E_{m\pm}+(K_z''-K_m'')\Omega_z \\ +(M_{zy}-B_{R2}-\sigma_{\theta y}-V_{IS})\Omega_N \quad (14)$$

At $\alpha=90$ $$T_{90}(0,0)=E_x-E_m+(-M_{xy}-V_{IS}+B_{R2}+\sigma_{\theta y})\Omega_z \\ +(M_{xy}+V_{IO})-B_{R1}-\sigma_{\phi z})\Omega_N \quad (15)$$

$$T_{90}(180,0)=-E_x-E_m+(M_{xy}-V_{IS}-B_{R2}-\sigma_{\theta y})\Omega_z \\ +(-M_{xz}-V_{IO}+B_{R1}+\sigma_{\phi z})\Omega_N \quad (16)$$

$$T_{90}(0,180)=-E_x-E_m+(M_{xy}+V_{IS}-B_{R2}-\sigma_{\theta y})\Omega_z \\ +(-M_{xz}-V_{IO}-B_{R1}+\sigma_{\phi z})\Omega_N \quad (17)$$

$$T_{90}(180,180)=E_x-E_m+(-M_{xy}+V_{IS}+B_{R2}+\sigma_{\theta y})\Omega_z \\ +(M_{xz}-V_{IO}+B_{R1}-\sigma_{\phi z})\Omega_N \quad (18)$$

$$T_{90}(90,0)=E_y-E_m-(K_y''-K_m'')\Omega_N \\ +(M_{yx}-V_{IS}-\sigma_{\theta x}-\sigma_{\phi z})\Omega_z \quad (19)$$

$$T_{90}(-90,0)=-E_y-E_m+(K_y''-K_m'')\Omega_N \\ +(-M_{yx}-V_{IS}+\sigma_{\theta x}+\sigma_{\phi x})\Omega_z \quad (20)$$

$$T_{90}(90,180)=E_y-E_m-(K_y''-K_m'')\Omega_N \\ +(M_{yx}+V_{IS}+\sigma_{\theta x}-\sigma_{\phi z})\Omega_z \quad (21)$$

$$T_{90}(-90,180)=-E_y-E_m+(K_y''-K_m'')\Omega_N \\ +(-M_{yx}+V_{IS}-\sigma_{\theta x}+\sigma_{\phi x})\Omega_z \quad (22)$$

$$T_{90}(0,90)=-E_z-E_m+E_{m\pm}+(K_z''-K_m'')\Omega_z \\ +(-M_{zx}-B_{R1}+V_{IO}-\sigma_{\phi x})\Omega_N \quad (23)$$

$$T_{90}(0,-90)=E_z-E_m-E_{m\pm}-(K_z''-K_m'')\Omega_z \\ +(-M_{zx}-B_{R1}+V_{IO}-\sigma_{\phi x})\Omega_N \quad (24)$$

$$T_{90}(180,90)=E_z-E_m-E_{m\pm}-(K_z''-K_m'')\Omega_z \\ +(-M_{zx}+B_{R1}-V_{IO}+\sigma_{\phi x})\Omega_N \quad (25)$$

$$T_{90}(180,-90)=-E_z-E_m+E_{m\pm}+(K_z''-K_m'')\Omega_z \\ +(M_{zx}+B_{R1}-V_{IO}+\sigma_{\phi x})\Omega_N \quad (26)$$

At $\alpha=180$ $$T_{180}(0,0)=E_x-E_m-(K_x''-K_m'')\Omega_N \\ +(-M_{xy}-V_{IS}+B_{R2}+\sigma_{\theta y})\Omega_z \quad (27)$$

$$T_{180}(180,0)=-E_x-E_m+(K_x''-K_m'')\Omega_N \\ +(M_{xy}-V_{IS}-B_{R2}-\sigma_{\theta y})\Omega_z \quad (28)$$

$$T_{180}(0,180)=-E_x-E_m+(K_x''-K_m'')\Omega_N \\ +(M_{xy}+V_{IS}-B_{R2}-\sigma_{\theta y})\Omega_z \quad (29)$$

$$T_{180}(180,180)=E_x-E_m-(K_x''-K_m'')\Omega_N \\ +(-M_{xy}+V_{IS}+B_{R2}+\sigma_{\theta y})\Omega_z \quad (30)$$

$$T_{180}(90,0)=E_y-E_m+(-M_{yz}+\sigma_{\phi z}-V_{IO}+B_{R1})\Omega_N \\ +(M_{yx}-V_{IS}-\sigma_{\theta x}-\sigma_{\phi x})\Omega_z \quad (31)$$

$$T_{180}(-90,180)=-E_y-E_m+(M_{yz}-\sigma_{\phi z}-V_{IO}+B_{R1})\Omega_N \\ +(-M_{yx}-V_{IS}+\sigma_{\theta x}+\sigma_{\phi x})\Omega_z \quad (32)$$

$$T_{180}(90,0)=E_y-E_m+(-M_{yz}+\sigma_{\phi z}+V_{IO}-B_{R1})\Omega_N \\ +(M_{yz}+V_{IS}+\sigma_{\phi x}-\sigma_{\phi x})\Omega_N \quad (33)$$

$$T_{180}(90,180)=E_y-E_m+(-M_{yz}+\sigma_{\phi z}+V_{IO}-B_{R1})\Omega_N \\ +(-M_{yx}+V_{IS}-\sigma_{\theta x}+\sigma_{\phi x})\Omega_z \quad (34)$$

$$T_{180}(0,90)=-E_z-E_m+E_{m\pm}+(K_z''-K_m'')\Omega_z \\ +(-M_{zy}+B_{R2}+\sigma_{\theta y}-V_{IS})\Omega_N \quad (35)$$

$$T_{180}(0,-90)=E_z-E_m-E_{m\pm}-(K_z''-K_m'')\Omega_z \\ +(M_{zy}-B_{R2}-\sigma_{\theta y}+V_{IS})\Omega_N \quad (36)$$

$$T_{180}(180,90)=E_z-E_m-E_{m\pm}-(K_z''-K_m'')\Omega_z \\ +(M_{zy}-B_{R2}-\sigma_{\theta y}-V_{IS})\Omega_N \quad (37)$$

$$T_{180}(180,-90)=-E_z-E_m+E_{m\pm}+(K_z''-K_m'')\Omega_z \\ +(-M_{zy}+B_{R2}+\sigma_{\theta y}+V_{IS})\Omega_N \quad (38)$$

At $\alpha=270 \;(-90)$ $$T_{-90}(0,0)=E_x-E_m+(-M_{xy}-V_{IS}+B_{R2}+\sigma_{\theta y})\Omega_z \\ +(-M_{xz}-V_{IO}+B_{R1}+\sigma_{\phi z})\Omega_N \quad (39)$$

$$T_{-90}(180,0)=-E_x-E_m+(M_{xy}-V_{IS}-B_{R2}-\sigma_{\theta y})\Omega_z \\ +(M_{xz}+V_{IO}-B_{R1}-\sigma_{\phi z})\Omega_z \quad (40)$$

$$T_{-90}(0,180)=-E_x-E_m+(M_{xy}+V_{IS}-B_{R2}-\sigma_{\theta y})\Omega_z \\ +(M_{xz}-V_{IO}+B_{R1}-\sigma_{\phi z})\Omega_N \quad (41)$$

$$T_{-90}(180,180)=E_x-E_m+(-M_{xy}+V_{IS}+B_{R2}+\sigma_{\theta y})\Omega_z \\ +(-M_{xz}+V_{IO}-B_{R1}+\sigma_{\phi z})\Omega_N \quad (42)$$

$$T_{-90}(90,0)=E_y-E_m+(K_y''-K_m'')\Omega_N \\ +(M_{yx}-V_{IS}-\sigma_{\theta x}-\sigma_{\phi x})\Omega_z \quad (43)$$

$$T_{-90}(-90,0)=-E_y-E_m-(K_y''-K_m'')\Omega_N \\ +(-M_{yx}-V_{IS}+\sigma_{\theta x}+\sigma_{\phi x})\Omega_z \quad (44)$$

$$T_{-90}(90,180)=E_y-E_m+(K_y''-K_m'')\Omega_N \\ +(M_{yx}+V_{IS}+\sigma_{\theta x}-\sigma_{\phi x})\Omega_z \quad (45)$$

$$T_{-90}(-90,180)=-E_y-E_m-(K_y''-K_m'')\Omega_N \\ +(-M_{yx}+V_{IS}-\sigma_{\theta x}+\sigma_{\phi x})\Omega_z \quad (46)$$

$$T_{-90}(0,90)=-E_z-E_m+E_{m\pm}+(K_z''-K_m'')\Omega_z \\ +(-M_{zx}+B_{R1}-V_{IO}+\sigma_{\phi x})\Omega_N \quad (47)$$

$$T_{-90}(0,90)=-E_z-E_m+E_{m\pm}+(K_z''-K_m'')\Omega_z \\ +(M_{zx}+B_{R1}-V_{IO}-\sigma_{\phi x})\Omega_N \quad (48)$$

$$T_{-90}(0,-90)=E_z-E_m-E_{m\pm}-(K_z''-K_m'')\Omega_z \\ +(M_{zx}-B_{R1}+V_{IO}-\sigma_{\phi x})\Omega_N \quad (49)$$

$$T_{-90}(180,-90)=-E_z-E_m+E_{m\pm}+(K_z''-K_m'')\Omega_z \\ +(-M_{zx}-B_{R1}+V_{IO}+\sigma_{\phi x})\Omega_N \quad (50)$$

Having knowledge of the monitor gyro torque for all positions from Equations 3 through 50, and knowledge of the platform control loop drift rates from Equations 51 through 62, the relationships between these quantities may be formed as shown in Equations 63 through 110.

The platform control loop drift rates, $(E_i)\alpha$, for the $i$th axis at platform angle $\alpha$ are $$(E_x)_0=E_x+K_x''\Omega_N-\nabla_x\Omega_z-M_{xy}\Omega_z \quad (51)$$

$$(E_y)_0=E_y+\phi_z\Omega_N+M_{zy}\Omega_N-\nabla_y\Omega_z+M_{yx}\Omega_z \quad (52)$$

$$(E_z)_0=E_z-K_z''\Omega_z-M_{zy}\Omega_N-\nabla_x\Omega_N \quad (53)$$

$$(E_x)_{90}=E_x+\phi_z\Omega_N+M_{xz}\Omega_N-M_{xy}\Omega_z-\nabla_x\Omega_z \quad (54)$$

$$(E_y)_{90}=E_y-K_y''\Omega_N-\nabla_y\Omega_z+M_{yx}\Omega_z \quad (55)$$

$$(E_z)_{90}=E_z-K_z''\Omega_z-M_{zx}\Omega_N+\nabla_y\Omega_N \quad (56)$$

$$(E_x)_{180}=E_x-K_x''\Omega_N-\nabla_x\Omega_z-M_{xy}\Omega_z \quad (57)$$

$$(E_y)_{180}=E_y-\phi_z\Omega_N-M_{yz}\Omega_N-\nabla_y\Omega_z+M_{yx}\Omega_z \quad (58)$$

$$(E_z)_{180}=E_z-K_z''\Omega_z+M_{zy}\Omega_N+\nabla_x\Omega_N \quad (59)$$

$$(E_x)_{-90}=E_x-M_{xz}\Omega_N-M_{xy}\Omega_z-\nabla_x\Omega_z-\phi_z\Omega_N \quad (60)$$

$$(E_y)_{-90}=E_y+K_y''\Omega_N-\nabla_y\Omega_z+M_{yx}\Omega_z \quad (61)$$

$$(E_z)_{-90}=E_z-K_z''\Omega_x+M_{zx}\Omega_N-\nabla_y\Omega_N \quad (62)$$

The several different relationships between loop drift rates and caging torques which will be used to bias the control loops are written for each $\alpha$ angle.

At $\alpha=0$ $$(E_x)_0=\frac{T_0(0,0)-T_0(180,0)}{2} \\ +K_m''\Omega_N-(B_{R2}+\sigma_{\theta y}+\nabla_x)\Omega_z \quad (63)$$

$$(E_x)_0=\frac{T_0(0,0)-T_0(0,180)}{2} \\ +K_m''\Omega_N-(B_{R2}-V_{IS}+\sigma_{\theta y}+\nabla_x)\Omega_z \quad (64)$$

$$(E_x)_0 = \frac{T_0(180,180) - T_0(180,0)}{2} + K_m''\Omega_N - (B_{R2} + V_{IS} + \sigma_{\theta y} + \nabla_x)\Omega_z \quad (65)$$

$$(E_x)_0 = \frac{T_0(180,180) - T_0(0,180)}{2} + K_m''\Omega_N - (B_{R2} + \sigma_{\theta y} + \nabla_x)\Omega_z \quad (66)$$

$$(E_y)_0 = \frac{T_0(90,0) - T_0(-90,0)}{2} - (V_{IO} - B_{R1} - \sigma_{\phi z})\Omega_N - (-\sigma_{\theta x} - \sigma_{\phi x} + \nabla_y)\Omega_z \quad (67)$$

$$(E_y)_0 = \frac{T_0(90,0) - T_0(-90,180)}{2} + \sigma_{\phi z}\Omega_N - (-V_{IS} - \sigma_{\phi x} + \nabla_y)\Omega_z \quad (68)$$

$$(E_y)_0 = \frac{T_0(90,180) - T_0(-90,0)}{2} + \sigma_{\phi z}\Omega_N - (V_{IS} - \sigma_{\phi x} + \nabla_y)\Omega_z \quad (69)$$

$$(E_y)_0 = \frac{T_0(90,180) - T_0(-90,180)}{2} - (B_{R1} - V_{IO} - \sigma_{\phi z})\Omega_N - (\sigma_{\theta x} - \sigma_{\phi x} + \nabla_y)\Omega_z \quad (70)$$

$$(E_z)_0 = \frac{T_0(0,-90) - T_0(0,90)}{2} + E_{m\pm} - K_m''\Omega_z - (B_{R2} + \sigma_{\theta y} - V_{IS} + \nabla_x)\Omega_N \quad (71)$$

$$(E_z)_0 = \frac{T_0(180,90) - T_0(0,90)}{2} + E_{m\pm} - K_m''\Omega_z - (B_{R2} + \sigma_{\theta y} + \nabla_x)\Omega_N \quad (72)$$

$$(E_z)_0 = \frac{T_0(0,-90) - T_0(180,-90)}{2} + E_{m\pm} - K_m''\Omega_z - (B_{R2} + \sigma_{\theta y} + \nabla_x)\Omega_N \quad (73)$$

$$(E_z)_0 = \frac{T_0(180,90) - T_0(180,-90)}{2} + E_{m\pm} - K_m''\Omega_z - (B_{R2} + \sigma_{\theta y} + V_{IS} + \nabla_x)\Omega_N \quad (74)$$

At $\alpha = 90$ $$(E_x)_{90} = \frac{T_{90}(0,0) - T_{90}(180,0)}{2} - (B_{R2} + \sigma_{\theta y} + \nabla_x)\Omega_z - (V_{IO} - B_{R1} - \sigma_{\phi z})\Omega_N \quad (75)$$

$$(E_x)_{90} = \frac{T_{90}(0,0) - T_{90}(0,180)}{2} - (B_{R2} - V_{IS} + \sigma_{\theta y} + \nabla_x)\Omega_z + \sigma_{\phi z}\Omega_N \quad (76)$$

$$(E_x)_{90} = \frac{T_{90}(180,180) - T_{90}(180,0)}{2} - (V_{IS} + B_{R2} + \sigma_{\theta y} + \nabla_x)\Omega_z + \sigma_{\phi z}\Omega_N \quad (77)$$

$$(E_x)_{90} = \frac{T_{90}(180,180) - T_{90}(0,180)}{2} - (B_{R2} + \sigma_{\theta y} + \nabla_x)\Omega_z - (B_{R1} - V_{IO} - \sigma_{\phi z})\Omega_N \quad (78)$$

$$(E_y)_{90} = \frac{T_{90}(90,0) - T_{90}(-90,0)}{2} - K_m''\Omega_N - (-\sigma_{\theta x} - \sigma_{\phi x} + \nabla_y)\Omega_z \quad (79)$$

$$(E_y)_{90} = \frac{T_{90}(90,0) - T_{90}(-90,180)}{2} - K_m''\Omega_N - (-V_{IS} - \sigma_{\theta x} - \sigma_{\phi x} + \nabla_y)\Omega_z \quad (80)$$

$$(E_y)_{90} = \frac{T_{90}(90,180) - T_{90}(-90,0)}{2} - K_m''\Omega_N - (V_{IS} + \sigma_{\theta x} - \sigma_{\phi x} + \nabla_y)\Omega_z \quad (81)$$

$$(E_y)_{90} = \frac{T_{90}(90,180) - T_{90}(-90,180)}{2} - K_m''\Omega_N - (\sigma_{\theta x} - \sigma_{\phi x} + \nabla_y)\Omega_z \quad (82)$$

$$(E_z)_{90} = \frac{T_{90}(0,-90) - T_{90}(0,90)}{2} + E_{m\pm} - K_m''\Omega_z - (\sigma_{\phi x} - \nabla_y)\Omega_N \quad (83)$$

$$(E_z)_{90} = \frac{T_{90}(180,90) - T_{90}(0,90)}{2} + E_{m\pm} - K_m''\Omega_z - (B_{R1} - V_{IO} + \sigma_{\phi x} - \nabla_y)\Omega_N \quad (84)$$

$$(E_z)_{90} = \frac{T_{90}(0,-90) - T_{90}(180,-90)}{2} + E_{m\pm} - K_m''\Omega_z - (V_{IO} - B_{R1} + \sigma_{\phi x} - \nabla_y)\Omega_N \quad (85)$$

$$(E_z)_{90} = \frac{T_{90}(180,90) - T_{90}(180,-90)}{2} + E_{m\pm} - K_m''\Omega_z - (\sigma_{\phi x} - \nabla_y)\Omega_N \quad (86)$$

At $\alpha = 180$ $$(E_x)_{180} = \frac{T_{180}(0,0) - T_{180}(180,0)}{2} - K_m''\Omega_N - (B_{R2} + \sigma_{\theta y} + \nabla_x)\Omega_z \quad (87)$$

$$(E_x)_{180} = \frac{T_{180}(0,0) - T_{180}(0,180)}{2} - K_m''\Omega_N - (B_{R2} - V_{IS} + \sigma_{\theta y} + \nabla_x)\Omega_z \quad (88)$$

$$(E_x)_{180} = \frac{T_{180}(180,180) - T_{180}(180,0)}{2} - K_m''\Omega_N - (B_{R2} + V_{IS} + \sigma_{\theta y} + \nabla_x)\Omega_z \quad (89)$$

$$(E_x)_{180} = \frac{T_{180}(180,180) - T_{180}(0,180)}{2} - K_m''\Omega_N - (B_{R2} + \sigma_{\theta y} + \nabla_x)\Omega_z \quad (90)$$

$$(E_y)_{180} = \frac{T_{180}(90,0) - T_{180}(-90,0)}{2} - (\sigma_{\phi z} - V_{IO} + B_{R1})\Omega_N - (-\sigma_{\theta x} - \sigma_{\phi x} + \nabla_y)\Omega_z \quad (91)$$

$$(E_y)_{180} = \frac{T_{180}(90,0) - T_{180}(-90,180)}{2}$$
$$- \sigma_{\phi z}\Omega_N - (-V_{IS} - \sigma_{\phi x} + \nabla_y)\Omega_z \quad (92)$$

$$(E_y)_{180} = \frac{T_{180}(90,180) - T_{180}(-90,0)}{2}$$
$$- \sigma_{\phi z}\Omega_N - (V_{IS} - \sigma_{\phi x} + \nabla_y)\Omega_z \quad (93)$$

$$(E_y)_{180} = \frac{T_{180}(90,180) - T_{180}(-90,180)}{2}$$
$$- (\sigma_{\phi z} + V_{IO} - B_{R1})\Omega_N - (\sigma_{\theta x} - \sigma_{\phi x} + \nabla_y)\Omega_z \quad (94)$$

$$(E_z)_{180} = \frac{T_{180}(0,-90) - T_{180}(0,90)}{2}$$
$$+ E_{m\pm} - K_m''\Omega_z - (V_{IS} - B_{R2} - \sigma_{\theta y} - \nabla_x)\Omega_N \quad (95)$$

$$(E_z)_{180} = \frac{T_{180}(180,90) - T_{180}(0,90)}{2}$$
$$+ E_{m\pm} - K_m''\Omega_z - (-B_{R2} - \sigma_{\theta y} - V_{IS} - \nabla_x)\Omega_N \quad (96)$$

$$(E_z)_{180} = \frac{T_{180}(0,-90) - T_{180}(180,-90)}{2}$$
$$+ E_{m\pm} - K_m''\Omega_z - (-B_{R2} - \sigma_{\theta y} - \nabla_x)\Omega_N \quad (97)$$

$$(E_z)_{180} = \frac{T_{180}(180,90) - T_{180}(180,-90)}{2}$$
$$+ E_{m\pm} - K_m''\Omega_z - (-B_{R2} - \sigma_{\theta y} - V_{IS} - \nabla_x)\Omega_N \quad (98)$$

At $\alpha = -90$ $$(E_x)_{-90} = \frac{T_{-90}(0,0) - T_{-90}(180,0)}{2}$$
$$- (B_{R2} + \sigma_{\theta y} + \nabla_x)\Omega_z - (-V_{IO} + B_{R1} + \sigma_{\phi z})\Omega_N \quad (99)$$

$$(E_x)_{-90} = \frac{T_{-90}(0,0) - T_{-90}(0,180)}{2}$$
$$- (-V_{IS} + B_{R2} + \sigma_{\theta y} + \nabla_x)\Omega_z - \sigma_{\phi z}\Omega_N \quad (100)$$

$$(E_x)_{-90} = \frac{T_{-90}(180,180) - T_{-90}(180,0)}{2}$$
$$- (V_{IS} + B_{R2} + \sigma_{\theta y} + \nabla_x)\Omega_z - \sigma_{\phi z}\Omega_N \quad (101)$$

$$(E_x)_{-90} = \frac{T_{-90}(180,180) - T_{-90}(0,180)}{2}$$
$$- (B_{R2} + \sigma_{\theta y} + \nabla_x)\Omega_z - (V_{IO} - B_{R1} + \sigma_{\phi z})\Omega_N \quad (102)$$

$$(E_y)_{-90} = \frac{T_{-90}(90,0) - T_{-90}(-90,0)}{2}$$
$$+ K_m''\Omega_N - (\sigma_{\theta x} - \sigma_{\phi x} + \nabla_y)\Omega \quad (103)$$

$$(E_y)_{-90} = \frac{T_{-90}(90,0) - T_{-90}(-90,180)}{2}$$
$$+ K_m''\Omega_N - (-V_{IS} - \sigma_{\phi x} + \nabla_y)\Omega_z \quad (104)$$

$$(E_y)_{-90} = \frac{T_{-90}(90,180) - T_{-90}(-90,0)}{2}$$
$$+ K_m''\Omega_N - (V_{IS} - \sigma_{\phi x} + \nabla_y)\Omega_z \quad (105)$$

$$(E_y)_{-90} = \frac{T_{-90}(90,180) - T_{-90}(-90,180)}{2}$$
$$+ K_m''\Omega_N - (\sigma_{\theta x} - \sigma_{\phi x} + \nabla_y)\Omega_z \quad (106)$$

$$(E_z)_{-90} = \frac{T_{-90}(0,-90) - T_{-90}(0,90)}{2}$$
$$+ E_{m\pm} - K_m''\Omega_z - (-\sigma_{\phi x} + \nabla_y)\Omega_N \quad (107)$$

$$(E_z)_{-90} = \frac{T_{-90}(180,90) - T_{-90}(0,90)}{2}$$
$$+ E_{m\pm} - K_m''\Omega_z - (-B_{R1} + V_{IO} - \sigma_{\phi x} + \nabla_y)\Omega_N \quad (108)$$

$$(E_z)_{-90} = \frac{T_{-90}(0,-90) - T_{-90}(180,-90)}{2}$$
$$+ E_{m\pm} - K_m''\Omega_z - (B_{R1} - V_{IO} - \sigma_{\phi x} + \nabla_y)\Omega_N \quad (109)$$

$$(E_z)_{-90} = \frac{T_{-90}(180,90) - T_{-90}(180,-90)}{2}$$
$$+ E_{m\pm} - K_m''\Omega_z - (-\sigma_{\phi x} + \nabla_y)\Omega_N \quad (110)$$

Examination of Equations 63 through 110 reveal that in order to utilize only the caging torques to correct the eliminated or determined: $K_m'''$, $(B_{R2} + \sigma_{\theta y} + \nabla_x)$, $V_{IS}$, $(V_{IO} - B_{R1})$, $\sigma_{\phi z}$, $\sigma_{\theta x}$, $(\sigma_{\phi x} - \nabla_y)$, and $E_{m\pm}$. The $\sigma_{\phi z}$ term is eliminated by system adjustment; the remainder of the terms will be determined and then compensated for in the computer mechanization. The adaptive mechanization allows for determining the required terms first in an initial calibration which uses both $T\alpha(\theta,\phi)$'s and pulse counting (will be explained later) for an initial determination, then updates the initial values using only $T\alpha(\theta,\phi)$'s which are also used for control loop biasing.

The initial calibration is discussed first, then the updating is discussed. A brief description of pulse-counting is required. The techniques of pulse counting are where the computer mechanization is adjusted to accumulate the required pulse rates to just offset the total loop uncompensated drift rates. This pulse rate, denoted $(T_1)\alpha$, for the $i$th axis at a platform angle of $\alpha$, will thus always be a torque equal to the negative of $(E_1)\alpha$, the $i$th control loop uncompensated drift rate at $\alpha$. This technique is well known to those individuals conversant with the state of the art. Equations 51 through 62 are thus the mathematical expressions for $-(T_1)\alpha$.

With the proper mechanization and a knowledge of latitude, Equations 3 through 62 may be used to determine the calibration terms.

The various determinations of the calibration terms are presented below:

$$V_{IS} = \frac{T_0(0,180) + T_0(180,180) - T_0(0,0) - T_0(180,0)}{4\Omega_z} \quad (111)$$

$$V_{IS} = \frac{T_0(-90,180) + T_0(90,180) - T_0(-90,0) - T_0(90,0)}{4\Omega_z} \quad (112)$$

$$V_{IS} = \frac{T_0(0,90) + T_0(180,90) - T_0(0,-90) - T_0(180,-90)}{4\Omega_z} \quad (113)$$

$$V_{IS} = \frac{T_{180}(0,180) + T_{180}(180,180) - T_{180}(180,0) - T_{180}(0,0)}{4\Omega_z} \quad (114)$$

$$V_{IS} = \frac{T_{180}(90,180) + T_{180}(-90,180) - T_{180}(-90,0) - T_{180}(90,0)}{4\Omega_z} \quad (115)$$

$$V_{IS} = \frac{T_{180}(180,-90) + T_{180}(0,-90) - T_{180}(180,90) - T_{180}(0,90)}{4\Omega_z} \quad (116)$$

Combining Equations 3 through 6 and 27 through 30 in the fashion of Equation 117 yields Equation 118.

$$(3) + (6) + (27) + (30) - (4) - (28) - (5) - (29)/8 \quad (117)$$

$$(E_x - M_{xy}\Omega_z) + (B_{R2} + \sigma_{\theta y})\Omega_z = \frac{T_0(0,0) + T_0(180,180)}{8} + \frac{T_{180}(0,0) + T_{180}(180,180)}{8} - \frac{T_0(180,0) - T_0(0,180)}{8} - \frac{T_{180}(180,0) - T_{180}(0,180)}{8} \quad (118)$$

Recalling that the pulse-counting torque $(T_1)$ $\alpha$ is the negative of $(E_1)$ $\alpha$, Equations 57 and 51 may be solved for $E_x - M_{xy}\Omega_z - \Delta_x\Omega_z$.

$$E_x - M_{xy}\Omega_z - \nabla_x\Omega_z = \frac{-(T_x)_0 - (T_x)_{180}}{2} \quad (119)$$

Also from (57) and (51), $$K_x'' = \frac{(T_x)_{180} - (T_x)_0}{2\Omega_N} \quad (120)$$

Combining (118) and (119), $$(B_{R2} + \sigma_{\theta y} + \nabla_x) = \frac{(T_x)_0 + (T_x)_{180}}{2\Omega_z} + \frac{T_0(0,0) + T_0(180,180)}{8\Omega_z} + \frac{T_{180}(0,0) + T_{180}(180,180) - T_0(180,0)}{8\Omega_z} - \frac{T_0(0,180) - T_{180}(180,0) - T_{180}(0,180)}{8\Omega_z} \quad (121)$$

Combining (3) through (6) and (27) through (30) in a different manner, $$-(K_x'' - K_m'')\Omega_n = \frac{T_0(180,0) + T_0(0,180) + T_{180}(0,0)}{8} + \frac{T_{180}(180,180) - T_0(0,0) - T_0(180,180)}{8} - \frac{T_{180}(180,0) - T_{180}(0,180)}{8} \quad (122)$$

Combining (122) and (120)

$$K_m'' = \frac{(T_x)_{180} - (T_x)_0}{2\Omega_n} + \frac{T_0(180,0) + T_0(0,180) + T_{180}(0,0) + T_{180}(180,180)}{8\Omega_N} - \frac{T_0(0,0) - T_0(180,180) - T_{180}(180,0) - T_{180}(0,180)}{8\Omega_N} \quad (123)$$

Combine (7) through (10) and (31) through (34) per Equation 124, yields Equation 125.

$$\frac{(7) - (31) - (8) + (32) + (10) - (34) - (9) + (33)}{8\Omega_N} \quad (124)$$

Per Equation 124, $$(V_{IO} - B_{R1}) = \frac{T_0(90,0) - T_{180}(90,0) - T_0(-90,0) + T_{180}(-90,0)}{8\Omega_N} - \frac{T_0(90,180) + T_{180}(90,180) + T_0(-90,180) - T_{180}(-90,180)}{8\Omega_N} \quad (125)$$

Combining (7) through (10) and (31) through (34) per Equation 126 yields a solution for $\sigma_{\theta x}$.

$$\frac{(7) + (8) + (9) - (10) - (31) + (32) + (33) - (34)}{8\Omega_z} \quad (126)$$

$$\sigma_{\theta x} = \frac{T_0(-90,0) - T_0(90,0) + T_0(90,180) - T_0(-90,180)}{8\Omega_z} - \frac{T_{180}(90,0) + T_{180}(-90,0)}{8\Omega_z} + \frac{T_{180}(90,180) - T_{180}(-90,180)}{8\Omega_z} \quad (127)$$

Manipulate Equations 11 through 14 and 35 through 38 first per Equation 128, then per Equation 129.

$$\frac{(11) + (12) + (13) - (14) + (35) - (36) - (37) + (38)}{8\Omega_N} \quad (128)$$

$$\frac{(11) + (12) + (13) - (14) - (35) + (36) + (37) - (38)}{8} \quad (129)$$

From 128, $$(-M_{zy} + B_{R2} + \sigma_{\theta y}) = \frac{T_0(0,-90) + T_0(180,90) - T_0(0,90) - T_0(180,-90)}{8\Omega_N} + \frac{T_{180}(0,90) - T_{180}(0,-90)}{8\Omega_N} - \frac{T_{180}(180,90) + T_{180}(180,-90)}{8\Omega_N} \quad (130)$$

Obtaining $z$ loop pulse-counting data at $\alpha=0$ and 180 (negative of Equations 53 and 59 respectively), the following may be written:

$$E_z - K_z''\Omega_z = \frac{-(T_z)_0 - (T_z)_{180}}{2} \quad (131)$$

$$M_{zy} + \nabla_x = \frac{(T_z)_0 - (T_z)_{180}}{2\Omega_N} \quad (132)$$

Combining (130) and (132), $$(B_{R2} + \sigma_{\theta y} + \nabla_x) = \frac{(T_z)_0 - (T_z)_{180}}{2\Omega_N} + \frac{T_0(0,-90) + T_0(180,90)}{8\Omega_N} - \frac{T_0(0,90) - T_0(180,-90) + T_{180}(0,90) - T_{180}(0,-90)}{8\Omega_N} - \frac{T_{180}(180,90) + T_{180}(180,-90)}{8\Omega_N} \quad (133)$$

From (129), $$E_z - E_{m\pm} - (K_z'' - K_m'')\Omega_z = \frac{T_0(0,-90) + T_0(180,90)}{8} - \frac{T_0(0,90) - T_0(180,-90) - T_{180}(0,90) + T_{180}(0,-90)}{8} + \frac{T_{180}(180,90) - T_{180}(180,-90)}{8} \quad (134)$$

Combining (131) and (134), $$-E_{m\pm} = \frac{(T_z)_0 + (T_z)_{180}}{2} - K_m'' \Omega_z +$$
$$\frac{T_0(0,-90) + T_0(180,90)}{8} -$$
$$\frac{T_0(0,90) - T_0(180,-90) - T_{180}(0,90) + T_{180}(0,-90)}{8} +$$
$$\frac{T_{180}(180,90) - T_{180}(180,-90)}{8}$$

(135)

Since $K_m''$ is known from Equation 123 and all other terms can be found within the system, Equation 135 yields a solution for $E_{m\pm}$.

Combining (15) through (18) as one group, (19) through (22) as a second group, (39) through (42) as a third group, and (43) through (46) as a fourth group, four solutions for $V_{IS}$ may be found.

From (15) through (18), $$V_{IS} = \frac{T_{90}(0,180) + T_{90}(180,180) - T_{90}(180,0) - T_{90}(0,0)}{4\Omega_z}$$

(136)

From (19) through (22), $$V_{IS} = \frac{T_{90}(90,180) + T_{90}(-90,180) - T_{90}(-90,0) - T_{90}(90,0)}{4\Omega_z}$$

(137)

From (39) through (42), $$V_{IS} = \frac{T_{-90}(180,180) + T_{-90}(0,180) - T_{-90}(180,0) - T_{-90}(0,0)}{4\Omega_z}$$

(138)

From (43) through (46), $$V_{IS} = \frac{T_{-90}(-90,180) + T_{-90}(90,180) - T_{-90}(-90,0) - T_{-90}(90,0)}{4\Omega_z}$$

(139)

Combining (23) through (26) as one group and (47) through (50) as a second group, two solutions for $(V_{I1} - B_{R1})$ may be obtained.

From (23) through (26), $$(V_{I0} - B_{R1}) = \frac{T_{90}(0,90) + T_{90}(0,-90) - T_{90}(180,90) - T_{90}(180,-90)}{4\Omega_N}$$

(140)

From (47) through (50), $$(V_{I0} - B_{R1}) = \frac{T_{-90}(180,-90) + T_{-90}(180,90) - T_{-90}(0,-90) - T_{-90}(0,90)}{4\Omega_N}$$

(141)

Equations 15 through 18 and 39 through 42 may be combined per 142.

$$\frac{(15) - (39) - (16) + (40) + (17) - (41) - (18) + (42)}{8\Omega_N}$$

(142)

From (142), $$(V_{I0} - B_{R1}) = \frac{T_{90}(0,0) - T_{90}(180,0) + T_{90}(0,180) - T_{90}(180,180)}{8\Omega_N} -$$
$$\frac{T_{-90}(0,0) + T_{-90}(180,0) - T_{-90}(0,180) + T_{-90}(180,180)}{8\Omega_N}$$

(143)

Equations 19 through 22 and 43 through 46 may be combined in two groups of four to yield two solutions of $\sigma_{\sigma x}$, and then per Equation 144 to yield the first part of a solution for $(\sigma_{\phi x} - \nabla_y)$.

$$\frac{(19) + (21) - (20) - (22) + (43) + (45) - (44) - (46)}{8}$$

(144)

Using (19) through (22), $$\sigma_{\theta x} = \frac{T_{90}(-90,0) + T_{90}(90,180) - T_{90}(90,0) - T_{90}(-90,180)}{4\Omega_z}$$

(145)

Using (43) through (46), $$\sigma_{\theta x} = \frac{T_{-90}(-90,0) + T_{-90}(90,180) - T_{-90}(90,0) - T_{-90}(-90,180)}{4\Omega_z}$$

(146)

Using (144), $$E_y + M_{yx}\Omega_z - \sigma_{\theta x}\Omega_z = \frac{T_{90}(90,0) + T_{90}(90,180)}{8} -$$
$$\frac{T_{90}(-90,0) - T_{90}(-90,180) + T_{-90}(90,0) + T_{-90}(90,180)}{8} -$$
$$\frac{T_{-90}(-90,0) - T_{-90}(-90,180)}{8}$$

(147)

Combining (55) and (61) and recalling that $$(T_1)\alpha = -(E_1)\alpha$$

$$E_y + M_{yx}\Omega_z - \nabla_y\Omega_z = \frac{-(T_y)_{90} - (T_y)_{-90}}{2}$$

(148)

$$K_y'' = \frac{(T_y)_{90} - (T_y)_{-90}}{2\Omega_N}$$

(149)

Combining (147) and (148), $$(\sigma_{\phi x} - \nabla_y) = \frac{-(T_y)_{90} - (T_y)_{-90}}{2\Omega_z} - \frac{T_{90}(90,0) + T_{90}(90,180)}{8\Omega_z} -$$
$$\frac{T_{90}(-90,0) - T_{90}(-90,180) + T_{-90}(90,0) + T_{-90}(90,180)}{8\Omega_z} -$$
$$\frac{T_{-90}(-90,0) - T_{-90}(-90,180)}{8\Omega_z}$$

(150)

Combining (19) through (22) and (43) through (46) yields a solution for $K_y'' - K_m''$).

$$(K_y'' - K_m'') = \frac{T_{90}(90,0) + T_{90}(90,180)}{8\Omega_N} -$$
$$\frac{T_{90}(-90,0) - T_{90}(-90,180) + T_{90}(-90,0) + T_{90}(-90,180)}{8\Omega_N} -$$
$$\frac{T_{90}(90,0) - T_{90}(90,180)}{8\Omega_N}$$

(151)

Combining (149) and (151), $$K_m'' = \frac{(T_y)_{90} - (T_y)_{-90}}{2\Omega_N} - \frac{T_{90}(90,0) + T_{90}(90,180)}{8\Omega_N} -$$
$$\frac{T_{-90}(-90,0) - T_{-90}(-90,180) + T_{90}(-90,0) + T_{90}(-90,180)}{8\Omega_N} -$$
$$\frac{T_{90}(90,0) - T_{90}(90,180)}{8\Omega_N}$$

(152)

Equations 23 through 26 and 47 through 50 may be combined per Equations 153 and 154).

$$\frac{(24)+(25)-(23)-(26)+(47)-(48)-(49)+(50)}{8} \quad (153)$$

$$\frac{(24)+(25)-(23)-(26)+(48)+(49)-(47)-(50)}{8} \quad (154)$$

From (153), $$(\sigma_{\phi x}-M_{sx}) =$$
$$\frac{T_{90}(0,-90)+T_{90}(180,90)-T_{90}(0,90)-T_{90}(180,-90)}{8\Omega_N}$$
$$+\frac{T_{-90}(0,90)+T_{-90}(180,-90)}{8\Omega_N}$$
$$-\frac{T_{-90}(0,-90)-T_{-90}(180,90)}{8\Omega_N} \quad (155)$$

From (154), $$E_s-E_{m\pm}-(K_s''-K_m'')\Omega_s =$$
$$\frac{T_{90}(0,-90)+T_{90}(180,90)-T_{90}(0,90)-T_{90}(180,-90)}{8}$$
$$-\frac{T_{-90}(0,90)-T_{-90}(180,-90)}{8}$$
$$+\frac{T_{-90}(0,-90)+T_{-90}(180,90)}{8} \quad (156)$$

Combining (56) and (62) and recalling that $$(T_1)\alpha = -(E_1)\alpha,$$

$$E_z - K_z''\Omega_z = \frac{-(T_z)_{90}-(T_z)_{-90}}{2} \quad (157)$$

$$(M_{sx}-\nabla_y) = \frac{(T_z)_{90}-(T_z)_{-90}}{2\Omega_N} \quad (158)$$

Combining (155) and (158), $$(\sigma_{\phi x}-\nabla_y) =$$
$$\frac{(T_z)_{90}-(T_z)_{-90}}{2\Omega_N}+\frac{T_{90}(0,-90)+T_{90}(180,90)}{8\Omega_N}$$
$$-\frac{T_{90}(0,90)-T_{90}(180,-90)+T_{-90}(0,90)+T_{-90}(180,-90)}{8\Omega_N}$$
$$-\frac{T_{-90}(0,-90)-T_{-90}(180,90)}{8\Omega_N} \quad (159)$$

Combining (156) and (157), $$-E_{m\pm} = \frac{(T_z)_{90}+(T_z)_{-90}}{2}-K_m''\Omega_z$$
$$+\frac{T_{90}(0,-90)+T_{90}(180,90)}{8}$$
$$-\frac{T_{90}(0,90)-T_{90}(180,-90)}{8}$$
$$-\frac{T_{-90}(0,90)-T_{-90}(180,-90)}{8}$$
$$+\frac{T_{-90}(0,-90)+T_{-90}(180,90)}{8} \quad (160)$$

Since $K_m''$ is known from either (152) or (123), Equation 160 yields a solution for $E_{m\pm}$.

Table I summarizes the calibration terms required and those equations by which the mechanization would determine them in the initial calibration.

TABLE I.—INITIAL CALIBRATION EQUATIONS

| No. | Calibration Term | Equation |
|---|---|---|
| 1 | $K_m''$ | AVE (123), (152). |
| 2 | $(B_{R2}+\sigma_{\theta y}+\nabla_x)$ | AVE (133), (121). |
| 3 | $V_{IS}$ | AVE (111), (112), (113), (114), (115), (116), (136), (137), (138), (139). |
| 4 | $(V_{IO}-B_{R1})$ | AVE (125), (140), (141), (143). |
| 5 | $\sigma_{\theta x}$ | AVE (127), (145), (146). |
| 6 | $(\sigma_{\theta x}-\nabla_y)$ | (159). |
| 7 | $E_{m\pm}$ | AVE (160), (135). |

Note that calibration terms 3, 4, 5 may be found in tthe normal navigate mode using the equations in Table I since only $T\alpha(\theta,\phi)$'s are used. Therefore, the equations in Table I may be used both for initial calibration and updating. Calibration term 2 may be updated using Equation 130 since $M_{zy}$ stability in a normal operating environment should be quite good. Calibration terms 1, 6 should not require updating since present state of the art can provide stabilities over several months in a normal operating environment which should be adequate to obtain excellent accuracy if the operations of Table I are repeated periodically. Calibration terms 1 and 7 can be updated in the navigate mode if some independent estimate of $E_{north}$ and $E_{vertical}$ can be obtained. Denoting the $i$th estimates of $E_{north}$ and $E_{vertical}$ as $E_{ni}$ and $E_{zi}$ respectively, a method, although not necessarily optimum, of updating calibration terms 1 and 7 are presented below.

$$K_m'' = \frac{\lambda M}{a\Omega_n}\sum_{i=1}^{a} E_{ni} \quad (161)$$

where $0<\lambda<1$ $$M=+1$$
$$M=-1$$
$$\alpha=0,-90$$
$$\alpha=180,90$$

$$E_{m\pm i}=\gamma E_{m\pm i}-(1-\gamma)E_{zi} \quad (162)$$

when $0<\gamma<1$

The actual mechanization is as follows. The system will be operated at $\alpha=90$ in the sequence shown on Table II. At the completion of each sequence $V_{IS}$, $(V_{IO}-B_{R1})$, and $\sigma_{\theta x}$ may be updated. When $42 \leq N \leq 78$, $\alpha$ is changed going to −90, 0, and 180 in turn, staying at each $\alpha$ other than 90 for one complete cycle of twelve readings. By following this pattern, and assuming a five-minute slew and settle with a fifteen-minute data accumulation, each control loop would be biased once each hour except for $\alpha$ periods which are one to two hours long. In addition to biasing the three control loops, the twelve steps immediately before and the twelve steps immediately after an $\alpha$ will be used to update $$(B_{R2}+\sigma_{\theta y}+\nabla_x)$$

With the given pattern, each calibration term may be updated periodically.

Table III shows which biasing equation is to be used at each step.

TABLE II.—$\theta, \phi$ SEQUENCE

| Step [1] | Notation | $\theta$ | $\phi$ |
|---|---|---|---|
| 1+12N | +z | 0 | −90 |
| 2+12N | +x | 0 | 0 |
| 3+12N | +y | 90 | 0 |
| 4+12N | −z | 0 | 90 |
| 5+12N | −x | 0 | 180 |
| 6+12N | −y | −90 | 180 |
| 7+12N | +z | 180 | 90 |
| 8+12N | +x | 180 | 180 |
| 9+12N | +y | 90 | 180 |
| 10+12N | −z | 180 | −90 |
| 11+12N | −x | 180 | 0 |
| 12+12N | −y | −90 | 0 |

[1] N starts at 0 and increases by 1 each twelve steps.

TABLE III.—BIASING EQUATIONS

| Step | Equation Used for Biasing | | | |
|---|---|---|---|---|
| | $\alpha=0$ | $\alpha=90$ | $\alpha=180$ | $\alpha=-90$ |
| 1+12N | 73 | 85 | 97 | 109 |
| 2+12N | 63 | 75 | 87 | 99 |
| 3+12N | 67 | 79 | 91 | 103 |
| 4+12N | 71 | 83 | 95 | 107 |
| 5+12N | 64 | 76 | 88 | 100 |
| 6+12N | 68 | 80 | 92 | 104 |
| 7+12N | 72 | 84 | 96 | 108 |
| 8+12N | 66 | 78 | 90 | 102 |
| 9+12N | 70 | 82 | 94 | 106 |
| 10+12N | 74 | 86 | 98 | 110 |
| 11+12N | 65 | 77 | 89 | 101 |
| 12+12N | 69 | 81 | 93 | 105 |

Reflecting on this proposed mechanization reveals that manufacturing tolerances on gyro input axis misalignments, monitor gimbal alignments, monitor resolver nulls, loop scale factors, platform axis alignments, gyro mass unbalance, and accelerometer bias values may all have quite loose manufacturing tolerances. In addition, stabilities of these quantities during shipping, handling, and storage may be relaxed by an order of magnitude from present tight limits. The only tight tolerances on the system are stabilities in a normal working environment after installation, and these only for monitor loop scale factor, monitor gyro mass unbalance, accelerometer bias, a few platform dimensions and the z gyro input axis misalignment. It is emphasized, however, that even the monitor mass unbalance, and the monitor scale factor can be updated periodically and, thus, application of optimum filtering or prediction schemes may allow these stabilities to be relaxed to a large extent.

*Momentum modulation*

As previously pointed out, the monitor gyro mass unbalance, $E_{m\pm}$, and the monitor loop scale factor error, $K_m''$, can be updated only by using external information. If the monitor gyroscope is equipped with momentum modulation capacity, then $E_{m\pm}$ can be found without the aid of external information. Although $K_m''$ updating still would require external information, such updating would not be required (in the present state of the art) for periods in excess of 90 days.

Consider only vertical loop monitoring at $\alpha=0$: Recall Equations 12, 11, 53 and 71:

$$(E_z)_0 = E_z - K_z''\Omega_z - M_{yz}\Omega_n - \nabla_x\Omega_n \quad (53)$$

$$T_0(0,90)_1 = -(E_z)_0 + E_{m\pm} - E_m + (B_{R2}+\delta_{\theta y}-V_{IS})\Omega_n + K_m''\Omega_z \quad (12)$$

$$T_0(0,90)_1 = -(E_z)_0 + E_{m\pm} - E_m - (B_{R2}+\delta_{\theta y}-V_{IS})\Omega_n - K_m''\Omega_z \quad (11)$$

$$\frac{T_0(0,-90)_1 - T_0(0,90)_1}{2} = (E_z)_0 - E_{m\pm} + (B_{R2}+\sigma_{\theta y}-V_{IS})\Omega_n + K_m''\Omega_z \quad (71)$$

If now the momentum of the monitor gyro is reduced (by reducing the speed of the rotor) to H/N where N is a constant and $T_0(0,-90)_2$ and $T_0(0.90)_2$ are obtained as before:

$$T_0(0,-90)_2 = (E_z)_0 - NE_{m\pm} - NE_m + (B_{R2}+\sigma_{\theta y}-V_{IS})\Omega_n + K_m''\Omega_z \quad (163)$$

$$T_0(0,90)_2 = -(E_z)_0 + NE_{m\pm} - NE_m - (B_{R2}+\sigma_{\theta y}-V_{IS})\Omega_n - K_m''\Omega_z \quad (164)$$

then $$\frac{T_0(0,-90)_2 - T_0(0,90)_2}{2} = (E_z)_0 - NE_{m\pm} + (B_{R2}+\sigma_{\theta y}-V_{IS})\Omega_n + K_m''\Omega_z \quad (165)$$

From Equations 71 and 165

$$E_{m\pm} = \frac{T_0(0,90)_2 - T_0(0,-90)_2}{2(N-1)} + \frac{T_0(0,-90)_1 - T_0(0,90)_1}{2(N-1)} \quad (166)$$

Note that after initial calibration either Equation 71 or Equation 165 can be used to determine $(E_z)_0$. Further note that other system parameters do not degrade the solution for $E_{m\pm}$ so long as they are stable for the few hours required to obtain the needed caging data. In this operation, event if the monitor gyro bias, $E_m$, shifted by a considerable amount as a result of rotor speed change, neither monitoring nor solution of $E_{m\pm}$ per Equation 166 would be degraded so long as $E_m$ was in steady state or changing very slowly at the time of data acquisition. The circuit of FIG. 8 may be utilized effectively in changing the rotor speed and in turn the momentum of the rotor.

A possible sequence for monitoring may be, e.g., +X(H), +Y(H), −X(H), −Y(H), +Z(H), −Z(H), +Z(H/N), −Z(H/N), +X(H), +Y(H), etc., or the steps in Table II could be run alternately at momentums H and H/N.

The utilization of momentum modulation by the adaptive mechanization allows updating of $E_{m\pm}$ at any $\alpha$ without hampering biasing of the three control loops. This aspect of the mechanization removes the requirement for gyro mass unbalance stabilities of any longer than several hours.

In summary there exists a requirement to eliminate certain error sources which contaminate control loop drift rate calculations by gyro monitoring. One method of eliminating some of these error sources is by precise manufacturing. Precise manufacturing is expensive and, by itself, does not become a panacea for guaranteeing stability. A far cheaper and more realistic method of eliminating these error sources is by in-field calibration using an adaptive mechanization after the system has been installed in its operating environment. With such a mechanization the manufacturing tolerances can be quite loose, normal shipping, handling and storage stability requirements can be eliminated, and the only requirement on most parameters, for successful system operation, will be short term stability under normal operating environments after installation.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A method of determining the errors of a three-axis gyroscopically stabilized platform having a plurality of platform stabilizing gyroscopes, said platform having an addditional gyroscope rotatably mounted thereto, compising the steps of:
(a) aligning the sensing axis of said additional gyroscope to the sensing axes of each of said platform stablizing gyroscopes in four distinct additional gyroscope orientations;
(b) determining the amount of torque required to keep said sensing axes substantially parallel in each of said distinct orientations; and
(c) computing the errors and additional gyroscope misalignments from said determined torques.

2. A method as recited in claim 1 and further comprising the step of repeating said steps with the rotor of said additional gyroscope operating at a different speed than that originally used.

3. A method for determining the errors of a gyroscope stablized platform having a plurality of platform stabilizing gyroscopes, said platform having an additional gyroscope mounted thereto, comprising the steps of:
(a) aligning the sensing axis of said additional gyroscope parallel to one of said platform stabilizing gyroscope's sensing axis in a first sense;
(b) determining the amount of torque required to keep said sensing axes parallel in said first sense;
(c) aligning the sensing axis of said additional gyroscope parallel to said one of said platform stabilizing gyroscope's sensing axis in an opposite sense;
(d) determining the amount of torque required to keep said sensing axes parallel in said opposite sense; and
(e) calculating the error of said one platform stabilizing gyroscope by utilizing said determined torque from steps (b) and (d).

4. A method for determining the errors of a gyroscope stablized platform having a plurality of platform stabilizing gyroscopes, said platform having an additional gyroscope rotatably mounted thereto, comprising the steps of:
(a) aligning the sensing axis of said additional gyroscope parallel to one of said platform stabilizing gyroscope's sensing axis in a first sense;
(b) determining the amount of torque required to keep said sensing axes parallel in said first sense;
(c) aligning the sensing axis of said additional gyroscope parallel to said one of said platform stabilizing gyroscope's sensing axis in an opposite sense;
(d) determining the amount of torque required to keep said sensing axes parallel in said opposite sense;
(e) determining the drift error of said one platform stabilizing gyroscope by utilizing said determined torque from steps (b) and (d);
(f) repeating steps (a) through (e) for each remaining platform stablizing gyroscope; and
(g) repeating steps (a) through (f) at preselected time intervals.

5. A method for determining the errors of a gyroscope stablized platform having a plurality of platform stabilizing gyroscopes, said platform having an additional gyroscope mounted thereto, comprising the steps of:
(a) aligning the sensing axis of said additional gyroscope parallel to one of said platform stabilizing gyroscope's sensing axis in a first sense;
(b) determining the amount of torque required to keep said sensing axes parallel in said first sense;
(c) aligning the sensing axis of said additional gyroscope parallel to said one of said platform stabilizing gyroscope's sensing axis in an opposite sense;
(d) determining the amount of torque required to keep said sensing axes parallel in said opposite sense;
(e) determining the drift error of said one platform stabilizing gyroscope by utilizing said determined torque from steps (b) and (d);
(f) applying a corrective torque to said one platform stabilizing gyroscope to substantially cancel said determined drift error;
(g) repeating steps (a) through (f) for each remaining platform stabilizing gyroscope; and (h) repeating steps (a) through (g) at preselected time intervals.

6. A method for determining the errors of a gyroscope stabilized platform, said platform having an additional gyroscope rotatably mounted thereto comprising the steps of:
(a) aligning the sensing axis of said additional gyroscope parallel to a said platform stabilizing gyroscope sensing axis in a first input sense with the output axis of said additional gyroscope perpendicular in a first output sense to said platform stabilizing gyroscope sensing axis;
(b) determining the amount of torque required to keep said sensing axes parallel in said first input sense;
(c) aligning the sensing axis of said additional gyroscope parallel to said platform stabilizing gyroscope sensing axis in an opposite input sense with the output axis of said additional gyroscope perpendicular in said first output sense to said platform stabilizing gyroscope sensing axis;
(d) determining the amount of torque required to keep said sensing axes parallel in said opposite input sense;
(e) aligning the sensing axis of said additional gyroscope parallel to said platform stabilizing gyroscope sensing axis in said first input sense with the output axis of said additional gyroscope perpendicular in an opposite output sense to said platform stabilizing gyroscope sensing axis;
(f) determining the amount of torque required to keep said sensing axes parallel in said first input sense;
(g) aligning the sensing axis of said additional gyroscope parallel to said platform stabilizing gyroscope sensing axis in said opposite input sense with the output axis of said additional gyroscope perpendicular in said opposite output sense to said platform stabilizing gyroscope sensing axis;
(h) determining the amount of torque required to keep said sensing axes parallel in said opposite input sense;
(i) determining the mechanical and electrical misalignment errors of said additional gyroscope from said determined torques; and
(j) determining the error of said stabilizing gyroscope from said determined torques.

7. A method in accordance with claim 6 and further comprising the step of repeating said steps with the speed of said additional gyroscope's rotor varied a predetermined amount for each of said parallel senses.

8. A method as recited in claim 7 and further comprising the step of repeating said steps at periodic time intervals.

9. In combination with a three gyroscope stabilized platform having three mutually perpendicular input axes defining three degrees-of-angular freedom;
a monitor gyroscope;
mounting means for providing said monitor gyroscope with rotational freedom about two of said three input axes;
positioning means for positioning said monitor gyroscope in any direction with respect to said input axes;
means for applying a torque to said monitor gyroscope in response to the precession of said monitor gyroscope for nulling said precession to zero;
means for determining the torque required to maintain said precession nulled and for providing a correction torque to each of the platform stabilizing gyroscopes as a function of said determined torques.

10. The combination as claimed in claim 9 wherein said monitor gyroscope is comprised of a rotor the speed of which may be varied a predetermined amount.

11. In combination with a three-gyroscope stabilized platform having three mutually perpendicular input axes defining three degrees-of-angular freedom;

a monitor gyroscope;

mounting means for providing said monitor gyroscope with rotational freedom about two of said three input axes;

positioning servo means for rotating said monitor gyro to any desired position;

pickoff means for detecting the precession of said monitor gyroscope;

torquer means for applying torques to said monitor gyroscope in response to signals from said pickoff means to null said precession to zero;

computer means mechanized to determine the torque required to maintain said monitor precession nulled and for providing a correction torque to each of the platform stabilizing gyroscopes as a function of said determined torques.

12. In combination with a gyroscope stabilized platform having three mutually perpendicular input axes defining three degrees-of-angular freedom;

a monitor gyroscope;

mounting means for rotatably mounting said monitor gyroscope to said platform so as to allow alignment of said gyroscope's sensing axis in alternate parallel directions to each of said platform input axes;

means providing alternate alignment command signals for aligning said monitor gyroscope's sensing axis in alternate directions to each of said platform input axes in turn;

servo means responsive to said alignment signals for detecting and nulling to zero the angular deviation of said monitor gyroscope's sensing axis from said desired platform input axis;

pickoff means for detecting the precession of said monitor gyroscope;

torque means responsive to said pickoff means for providing a torque to said monitor gyroscope to null said precession to zero;

means for detecting the torque required to maintain said precession to zero;

means for comparing the differences in said detected torques in said alternate direction and for supplying a correcting torque to said platform about said sensed platform input axis so as to correct for drifts about said platforms input axis.

13. A gyroscope stabilized device, comprising:

a platform having a single-degree-of-angular freedom about a platform axis;

a first gyroscope for stabilizing said platform;

a second gyroscope, said first and second gyroscope each having drift characteristics, a spin axis, an output axis, and a sensing axis, with said axes mutually perpendicular to each other, said first gyroscope mounted on said platform with its sensing axis parallel to said platform axis;

supporting means arranged to provide said second gyroscope with rotational feedom so as to allow said second gyroscope's sensing axis to be aligned parallel to said first gyroscope's sensing axis in alternate directions;

each of said first and second gyroscope having pickoff means for detecting precession of said gyroscopes about their output axes relative to said platform;

each of said first and second gyroscopes further having torquer means responsively connected to its associated pickoff means for applying torques to the output axis of its associated gyroscope so as to null said pickoffs;

means for providing alternate alignment signals, one of said signals for aligning the sensing axes of said first and said second gyroscopes in the same direction and the other of said signals for aligning said sensing axes in a reversed direction;

servomechanism means responsive to said alignment signals for positioning said second gyroscope's sensing axis;

means responsively connected to said second gyroscope's torquer means for determining the amount of torques required to keep said second gyroscope nulled in said same and said reversed directions so that the drift of said first gyroscope may be determined.

14. A device as recited in claim 13 in which said servomechanism means for positioning said second gyroscope comprises, a resolver connected to detect the angular deviation of said second gyroscope input axis from a desired alignment signal direction, torquer means responsive to said resolver for applying a torque to said second gyroscope.

15. A device as recited in claim 13 in which said torque determining means is a computer programmed to calculate the drift of said first gyroscope from said second gyroscope detected torque and to periodically supply correcting torques to said first gyroscope torquing means so as to substantially eliminate the effects of said first gyroscope drift characteristics.

References Cited

UNITED STATES PATENTS

| | | | |
|---|---|---|---|
| 3,127,774 | 4/1964 | Fischer et al. | 74—5.34 X |
| 3,176,524 | 4/1965 | Schlitt et al. | 74—5.37 |
| 3,269,024 | 8/1966 | Fischer et al. | 74—5.34 X |
| 3,269,195 | 8/1966 | Cahoon et al. | 74—5.34 |
| 3,272,018 | 9/1966 | Watt | 74—5.34 |

FRED C. MATTERN, JR, *Primary Examiner.*

J. D. PUFFER, *Assistant Examiner.*